(12) United States Patent
Kim et al.

(10) Patent No.: US 7,372,842 B2
(45) Date of Patent: May 13, 2008

(54) APPARATUS AND METHOD FOR MINIMIZING A NON-TRANSMITTABLE PERIOD DUE TO A COMPRESSED MODE IN A MOBILE COMMUNICATION SYSTEM SUPPORTING HSDPA

(75) Inventors: Sung-Hoon Kim, Seoul (KR); Sung-Ho Choi, Songnam-shi (KR); Ju-Ho Lee, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 1076 days.

(21) Appl. No.: 10/306,528

(22) Filed: Nov. 27, 2002

(65) Prior Publication Data

US 2003/0108027 A1 Jun. 12, 2003

(30) Foreign Application Priority Data

Nov. 28, 2001 (KR) .................. 10-2001-0074599

(51) Int. Cl.
*H04J 3/00* (2006.01)
(52) U.S. Cl. ........................................ 370/345
(58) Field of Classification Search ............... None
See application file for complete search history.

(56) References Cited

U.S. PATENT DOCUMENTS 6,337,989 B1* 1/2002 Agin .................. 455/522

2002/0003785 A1* 1/2002 Agin .................. 370/333

FOREIGN PATENT DOCUMENTS

EP 1 286 491 A1 2/2003
WO WO 99/48227 9/1999

* cited by examiner

*Primary Examiner*—Edan Orgad
*Assistant Examiner*—Blanche Wong
(74) *Attorney, Agent, or Firm*—The Farrell Law Firm, PC

(57) ABSTRACT

An apparatus and method for minimizing a non-transmittable period where high-speed packet data transmission is impossible. In the apparatus, a non-transmittable period calculator receives transmission gap-related information for a UE from a radio network controller, calculates a transmission gap starting point based on the transmission gap-related information, defines a period determined by excluding the downlink transmission period from the transmission gap starting point as the non-transmittable period, and suspends transmission of the high-speed packet data to the UE for the non-transmittable period. A scheduler performs scheduling on the high-speed packet data under the control of the non-transmittable period calculator so that transmission of the high-speed packet data to the UE is suspended for the downlink transmission period.

22 Claims, 14 Drawing Sheets

APPARATUS AND METHOD FOR MINIMIZING A NON-TRANSMITTABLE PERIOD DUE TO A COMPRESSED MODE IN A MOBILE COMMUNICATION SYSTEM SUPPORTING HSDPA

PRIORITY

This application claims priority to an application entitled "Apparatus and Method for Minimizing Non-transmittable Period Due to Compressed Mode in a Mobile Communication System Supporting HSDPA" filed in the Korean Industrial Property Office on Nov. 28, 2001 and assigned Serial No. 2001-74599, the contents of which are incorporated herein by reference.

BACKGROUND OF THE INVENTION

1. Field of the Invention

The present invention relates generally to an HSDPA (High Speed Downlink Packet Access) communication system, and in particular, to an apparatus and method for minimizing a non-transmittable (or transmission impossibility) period due to execution of a compressed mode.

2. Description of the Related Art

In general, HSDPA (High Speed Downlink Packet Access) refers to a technique for transmitting data using HS-DSCH (High Speed-Downlink Shared Channel), a downlink data channel supporting high-speed downlink packet transmission, and its associated control channels in an UMTS (Universal Mobile Telecommunications System) mobile communication system, a $3^{rd}$ generation asynchronous mobile communication system. The UMTS communication system supports a compressed mode, and a description of the compressed mode will be made herein below.

The "compressed mode" is a technique for providing a measurement period needed by a UE (User Equipment) to perform an inter-frequency handover (inter-FR HO), i.e., a handover between different frequencies, or an inter-RAT (Radio Access Technology) handover (inter-RAT HO), i.e., a handover between different access technologies. A typical process of performing a handover by the UE is as follows. First, the UE receives primary common pilot channel (PCPICH) signals from a plurality of possible cells, and measures strengths of the received PCPICH signals. Thereafter, the UE reports the measured strengths of the received PCPICH signals to a radio network controller (RNC). The RNC then determines, based on the strengths of the PCPICH signals reported by the UE, (1) whether the UE must perform a handover, and (2) a cell among the plurality of cells, to which the UE, if it must perform a handover, must be handed over. That is, in order to perform the handover, the UE requires a process of measuring PCPICH signals from neighbor cells.

As stated above, in order to perform a handover, the UE requires the process of measuring PCPICH signals from neighbor cells, and if, however, a frequency and a radio access technique used by a current cell to which the UE belongs are different from a frequency and a radio access technique used by the neighbor cells, the UE has difficulty performing the handover. That is, if the neighbor cells use a frequency or a radio access technique different from that of the current cell to which the UE belongs, the UE must change a frequency or a radio access technique of its transceiver in order to measure PCPICH signals from the neighbor cells. For example, when a particular UE A performs communication through UTRAN (UMTS Terrestrial Radio Access Network) with a frequency band of 2,000 MHz (hereinafter referred as "F__1") and performs inter-FR/inter-RAT HO to a GSM (Global System for Mobile communication) cell with a frequency band of 800 MHz (hereinafter referred to as "F__2"), the UE A suspends communication performed at the F__1, and then measures a signal received at the F__2, after tuning a frequency band of its transceiver to the F__2. Thereafter, the UE A must resume communication through the UTRAN by tuning its transceiver from the F__2 to the F__1. That is, as described above, the compressed mode is a technique for suspending communication between the UE and the network for a predetermined period so that the UE can switch to a frequency or a radio access technology different from that of the current cell and measure a necessary signal.

Now, a procedure for supporting the compressed mode in the UMTS communication system will be described with reference to FIG. 1.

FIG. 1 is a flow diagram illustrating a process of performing a compressed mode in a conventional UMTS communication system. In FIG. 1, ellipses represent protocol entities for transmitting and receiving messages. A message transmission/reception protocol entity between UE and RNC is an RNC (Radio Resource Control) entity, and a message transmission/reception protocol entity between Node B and RNC is NBAP (Node B Application Part) entity. Information elements (IEs) that must be included in the messages are illustrated in Table 1. For simplicity, Table 1 shows only the information related to the compressed mode. Further, Table 1 shows references that provide a full list of the corresponding IE.

TABLE 1

| IE | MESSAGE REFERENCE |
|---|---|
| | 101 RRC CONNECTION SETUP |
| — | 3GPP TS 25.331 v4.1.0 ch 10.2.40 |
| | 102 RADIO LINK SETUP REQUEST |
| Transmission Gap Pattern Sequence Information | 3GPP TS 25.433 v4.1.0 ch 9.1.36 |
| | 103 RADIO LINK SETUP RESPONSE |
| — | 3GPP TS 25.433 v4.1.0 ch 9.1.37 |
| | 104 RRC CONNECTION SETUP |
| Downlink DPCH info common for all RL | 3GPP TS 25.331 v4.1.0 ch 10.2.41 |
| | 105 RRC CONNECTION SETUP COMPLETE |
| — | 3GPP TS 25.331 v4.1.0 ch 10.2.42 |
| | 106 MEASUREMENT REPORT |
| — | 3GPP TS 25.331 v4.1.0 ch 10.2.19 |
| | 107 COMPRESSED MODE COMMAND |
| Active Pattern Sequence Information | 3GPP TS 25.433 v4.1.0 ch 9.1.60 |
| | 108 MEASUREMENT CONTROL |
| — | 3GPP TS 25.331 v4.1.0 ch 10.2.17 |

Now, a process of performing the compressed mode in the UMTS communication system will be described herein below with reference to FIG. 1 and Table 1.

If UE enters a particular cell, the UE acquires necessary system information (SI) through a cell selection process, and then transmits an RRC Connection Request message to RNC through Node B (Step 101). Here, the "cell selection process" is a process of adjusting synchronization with a cell using a common pilot channel (CPICH) and a primary common control channel (PCCPCH) of the cell, and then acquiring random access channel (RACH) information. The RRC Connection Request message has UE identity IE inserted therein so that the RNC can determine whether to approve RRC connection setup to the corresponding UE. The RRC connection normally is a signaling connection for transmitting necessary information to a network after the UE initially accesses the system. However, in some cases, a dedicated physical channel (DPCH) for transmitting user data is included in the RRC connection. In the following description of FIG. 1, it will be assumed that the RRC Connection Request message includes the DPCH. Upon receiving the RRC Connection Request message, RNC determines whether to approve RRC connection to the corresponding UE based on UE identity IE, and then transmits a Radio Link Setup Request message to a Node B where the UE is currently located (Step 102). The Radio Link Setup Request message includes information for making the DPCH, such as uplink/downlink scrambling codes, OVSF (Orthogonal Variable Spreading Factor) code, transmission power-related information, and compressed mode-related information. For the compressed mode-related information, there is an IE of Transmission Gap Pattern Sequence Information. This IE includes the information obtained by the mapping information (Transmission Gap Pattern Sequence information) on a length or frequency of a transmission gap and a position in a radio frame, to be used in the compressed mode, to a particular logical identifier, and a detailed description of this will be made later.

Upon receiving the Radio Link Setup Request message, the Node B forms DPCH corresponding to the DPCH information requested by the RNC, and transmits a Radio Link Setup Response message indicating successful formation of the DPCH to the RNC (Step 103). Upon receiving the Radio Link Setup Response message, the RNC transmits an RRC Connection Setup message with information related to the formed DPCH to the UE (Step 104). The RRC Connection Setup message also includes compressed mode-related information, and the compressed mode-related information is included in Transmission Gap Pattern Sequence Information within an IE of Downlink DPCH info common for all radio links. Upon receiving the RRC Connection Setup message, the UE forms DPCH according to DPCH information included in the received the RRC Connection Setup message, and after completion of forming the DPCH, transmits an RRC Connection Setup Complete message to the RNC (Step 105). When steps 101 to 105 are completed, the UE can transmit and receive user data over the formed DPCH. The UE measures strength of a CPICH signal received from a neighbor cell, while transmitting and receiving the user data. If the measured strength of the CPICH signal received from the neighbor cell is higher than a threshold, or higher than strength of a CPICH signal received from the current cell, then the UE reports this information to the RNC through a Measurement Report message (Step 106). Here, the UE transmits the Measurement Report message to the RNC at a point of time indicated by the RRC Connection Setup message transmitted from the RNC in step 104.

Upon receiving the Measurement Report message, the RNC can transmit an inter-frequency measurement request to the UE in a state as illustrated in FIG. 2. Now, a process of sending the inter-frequency measurement request from the RNC to the UE will be described with reference to FIG. 2.

FIG. 2 schematically illustrates a state in which inter-frequency measurement is required in a general UMTS communication system. Referring to FIG. 2, if UE 211 is located in a boundary region between cells using different frequency bands, i.e., if the UE 211 is located in a boundary region between a UMTS cell_A 200 and a GSM cell_B 250, the RNC (not shown) can perceive this fact through a Measurement Report message transmitted by the UE 211. In preparation for handing over the UE 211 to the GSM cell_B 250, the RNC can transmit an inter-frequency measurement command to the GSB cell_B 250. As illustrated in FIG. 2, the UMTS cell_A 200 and the GSM cell_B 250 use different frequencies, e.g., the UMTS cell_A 200 uses a frequency F_1 and the GSM cell_B 250 uses a frequency F_2, so the UE 211 currently in communication with the UMTS cell_A 200 must suspend communication with the UMTS cell_A 200 in order to measure a PCPICH signal from the GSM cell_B 250. Such a period for suspending communication for a handover to a different frequency or a different radio access technology is called "transmission gap." Further, the RNC must transmit a message so that the UE 211 and a Node B_A 201 managing the UMTS cell_A 200 can suspend and resume communication with each other at the same time.

In FIG. 2, the RNC transmits a Compressed Mode Command message to the Node B (Step 107), and a Measurement Control message to the UE (Step 108). The Compressed Mode Command message includes: (i) TGPSI (Transmission Gap Pattern Sequence Identifier) indicating one of a plurality of Transmission Gap Pattern Sequences transmitted over Transmission Gap Pattern Sequence Information of the Radio Link setup Request message; (ii) TGCFN (Transmission Gap Connection Frame Number) indicating a radio frame number from which a corresponding TGPS (Transmission Gap Pattern Sequence) starts; (iii) TGPRC (Transmission Gap Pattern Repetition Counter) indicating the number of repeating the TGPS; and (iv) TGSN (Transmission Gap Starting Slot Number) indicating a slot from which the first Transmission Gap starts. A detailed description of the information included in the Compressed Mode Command message will be made later.

Upon receiving the Compressed Mode Command message, the Node B prepares to perform a compressed mode based on the information included in the Compressed Mode Command message, and starts performing the compressed mode at the TGCFN included in the Compressed Mode Command message. Upon receiving the Measurement Control message, the UE starts performing the compressed mode at the TGCFN based on information included in an IE of DPCH compressed mode info, i.e., based on the same information as the information included in the Compressed Mode Command message. In this manner, the compressed mode is started between the UE and the Node B.

Next, a transmission format for the compressed mode will be described with reference to FIG. 3.

FIG. 3 schematically illustrates a general transmission format for the compressed mode. Referring to FIG. 3, the compressed mode includes a plurality of different Transmission Gap patterns, which represent TGPS, and shows a certain TGPS. In each TGPS, a first Transmission Gap Pattern (TGP1) and a second Transmission Gap Pattern (TGP2) are alternately repeated by TGPRC. Different TGPSs have different TGP1 and TGP2. The TGPS is individually transmitted to the Node B and the UE over the Radio Link Setup Request message and RRC Connection Setup message described in conjunction with FIG. 1, and the information transmitted over each of the Radio Link Setup Request message and RRC Connection Setup message is as follows.

(1) TGPS include as many TGP1 and TGP2 as there are TGPRC.

(2) Each TGP includes TG1 and TG2, and the UE performs inter-frequency measurement at the TG1 and TG2.

(3) A starting point of the TG1 is calculated from the TGCFN and TGSN. That is, a starting point of the TG1 is a $TGSN^{th}$ time slot of the TGCFN radio frame.

(4) A starting point of the TG2 is defined as TGD (Transmission Gap Distance (TGD). That is, a starting point of the TG2 is a $TGD^{th}$ time slot from the starting point of the TG1.

(5) A size of the TG1 is equal to a length of TGL1 time slots.

(6) A size of the TG2 is equal to a length of TGL2 time slots.

(7) The total size of the TGP1 is equal to a length of TGPL1 radio frames.

(8) The total size of the TGP2 is equal to a length of TGPL2 radio frames.

The stated-above information (1) to (8) will be described herein below.

Each TGPS is identified by a TGPSI, and information constituting the TGPS includes information on TGP1 and information on TGP2. The information on TGP1 includes TGPL1, TG1, TG2 and TGD, and the information on TGP2 includes TGPL2, TG1, TG2 and TGD. The individual information has an independent value, and must be previously transmitted to the UE and the Node B over the RRC Connection Request message or Radio Link Setup message before the compressed mode is started. In addition to the above-stated information, the information constituting the TGPS includes TGPRS, TGCFN, and TGSN, and this information is commonly applied to TGP1 and TGP2, and individually transmitted to the UE and the Node B over the Measurement Control message and Compressed Mode Command message just before the compressed mode is started.

In addition, the radio frame is a unit indicating a transmission point in an UMTS system. Each radio frame includes 15 time slots TS#0-TS#14 and has a 10 msec length. Further, each time slot has a 0.667 msec length and includes 2,560 chips. Beginning when the DPCH is formed between the UE and the RNC, a CFN (Connection Frame Number) increases one by one. That is, if the DPCH, or a dedicated channel (DCH), between the UE and the RNC is formed in a particular radio frame, the CFN increases one by one each time one radio frame elapses, beginning at a point of time when the DPCH is formed. For the same UE, the RNC, UE and Node B maintain the same CFN. If the RNC transmits the compressed mode execution information to the Node B and UE in this way, the Node B and UE suspend transmission/reception every Transmission Gap based on the received compressed mode execution information, and the UE performs inter-frequency measurement.

Above, the compressed mode execution process has been described. Next, a description of the HSDPA will be made.

In general, the HSDPA refers to a data transmission technique using an HS-DSCH for supporting the high-speed downlink packet transmission and its associated control channels in an UMTS communication system. AMC (Adaptive Modulation and Coding), HARQ (Hybrid Automatic Retransmission Request), and FCS (Fast Cell Selection) techniques have been proposed to support the HSDPA. Herein, a structure of the UMTS communication system will be first described with reference to FIG. 4. A detailed description will be made of the AMC, HARQ, and FCS techniques.

FIG. 4 schematically illustrates a conventional CDMA communication system. Referring to FIG. 4, the UMTS communication system includes a core network (CN) 400, a plurality of radio network subsystems (RNSs) 410 and 420, and a UE 430. The RNS 410 and RNS 420 each include a RNC and a plurality of Node Bs. For example, the RNS 410 is comprised of the RNC 411 and a plurality of Node Bs 413 and 415. The RNC is classified into a Serving RNC (SRNC), a Drift RNC (DRNC), and a Controlling RNC (CRNC) according to its function. Functions of the SRNC and DRNC are defined according to their UE, and the SRNC and DRNC manage an information on the UE. A RNC managing data communication with the CN 400 is called SRNC of the UE. When data from the UE is transmitted to the corresponding SRNC through another RNC instead of the corresponding SRNC of the UE, the RNC instead of the corresponding SRNC is called DRNC of the UE. In addition, the RNC controlling the Node Bs is called CRNC of the Node Bs. In FIG. 4, if the RNC 411 manages information on the UE 430, the RNC 411 becomes the SRNC of the UE 430, and if data of the UE 430 is transmitted and received through RNC 421 due to the movement of the UE 430, then the RNC 421 becomes the DRNC. In addition, the RNC 411 controlling the Node B 413 becomes the CRNC of the Node B 413.

Next, the AMC, FCS, and HARQ techniques proposed to support the HARQ will be described with reference to FIG. 4.

AMC is a data transmission technique for adaptively determining a modulation technique and a coding technique of a data channel according to a channel condition between a specific Node B 423 and a UE 430, thus increasing the overall utilization efficiency of the Node B 423. Therefore, the AMC supports a plurality of modulation techniques and coding techniques, and modulates and codes a data channel signal by combining the modulation techniques and the coding techniques. Commonly, each combination of the modulation techniques and the coding techniques is called "MCS (Modulation and Coding Scheme)," and there are defined a plurality of MCS levels of #1 to #n according to the number of the MCSs. That is, the AMC adaptively determines an MCS level according to a channel condition of the UE 430 and the Node B 423 to which the UE 430 is currently wirelessly connected, thereby increasing the entire utilization efficiency of the Node B.

FCS is a technique for fast selecting a cell having the best channel condition among a plurality of cells, when a UE supporting the HSDPA (hereinafter referred to as "HSDPA UE") is located in a cell boundary region, or a soft handover region. Specifically, in the FCS, if HSDPA UE 430 enters a cell boundary region between Node B 423 and Node B 425, the UE 430 establishes radio links to a plurality of cells, i.e., the Node B 423 and the Node B 425. Here, a set of the cells to which the UE 430 has established the radio links is called an "active set." The UE 430 reduces overall interference by receiving HSDPA packet data only from the cell maintaining the best channel condition among the cells included in the active set. Here, a cell in the active set, which transmits HSDPA packet data due to its best channel condition, is called a "best cell," and the UE 430 periodically checks channel conditions of the cells in the active set and transmits a best cell indicator to the cells belonging to the active set in order to replace the current best cell with a new best cell having the better channel condition. The best cell indicator includes a cell ID of a cell selected as a best cell, and the cells in the active set receive the best cell indicator and detect the cell ID included in the best cell indicator. Each of the cells in the active set determines whether the received best cell indicator includes its own cell ID. As a result of the determination, if the best cell indicator includes its own cell ID, the corresponding cell transmits packet data to the UE 430 over the HS-DSCH.

A description will be made herein below of the HARQ, especially n-channel SAW HARQ (Stop and Wait Hybrid Automatic Retransmission Request). The HARQ newly proposes the following two plans in order to increase transmission efficiency of the existing ARQ (Automatic Retransmission Request). First, a retransmission request and a response are exchanged between a UE and a Node B. Second, defective data is temporarily stored, and combined with retransmitted data of the corresponding data. Further, the HSDPA has introduced the n-channel SAW HARQ in order to make up for a shortcoming of the conventional SAW ARQ. The SAW ARQ does not transmit the next packet data until it receives ACK for the previous packet data. Therefore, in some cases, the SAW ARQ must await ACK, although it can currently transmit the next packet data. However, in the n-channel SAW HARQ, the next packet data is continuously transmitted before ACK for the previous packet data is received, thereby increasing utilization efficiency of channels. That is, if n logical channels are established between a UE and a Node B, and the n logical channels can be can be identified by time and unique channel numbers, then the UE can recognize a channel over which packet data was received, and rearrange the received packets in the right reception order, or soft-combine the received packets.

Soft combing is a technique for temporarily storing defective data at a receiver and then combining the stored defective data with retransmitted data of the corresponding data, thus decreasing an error rate. The soft combing technique is divided into a Chase Combining (CC) technique and an Incremental Redundancy (IR) technique.

In the CC, a transmitter uses the same format at both initial transmission and retransmission. If m symbols were transmitted over one coded block at initial transmission, m the same symbols are transmitted even at retransmission. That is, the same coding rate is applied to the initial transmission and the retransmission. A receiver then combines the initially transmitted coded block with the retransmitted coded block, and performs a CRC (Cyclic Redundancy Check) operation on the combined coded block to determine whether an error occurs in the combined coded block.

In the IR, a transmitter uses different formats at initial transmission and retransmission. If n-bit user data was generated into m symbols through channel coding, the transmitter transmits a part of the m symbols at initial transmission, and sequentially transmits the remaining symbols at retransmission. That is, a coding rate for initial transmission is different from a coding rate for retransmission. The receiver then assembles a coded block with a high coding rate by attaching the retransmitted parts to the tail of the initially transmitted coded block, and performs error correction on the assembled coded block. In the IR, the initial transmission and each retransmission are identified by a version number. The initial transmission has a version number 1, a first retransmission has a version number 2, and a second retransmission has a version number 3. The receiver correctly combines the initially transmitted coded block with the retransmitted coded block using the version number.

The n-channel SAW HARQ introduces the following techniques in order to increase efficiency of the existing SAW ARQ. In the existing SAW ARQ, Node B does not transmit the next packet data until ACK (Acknowledgement) for the previously transmitted packet data is received. However, in the n-channel SAW HARQ, the Node B increases utilization efficiency of a radio link by continuously transmitting a plurality of data packets before receiving the ACK for the previously transmitted packet data. That is, in the n-channel SAW HARQ, n logical channels are established between UE an Node B and identified by time or channel numbers, so that the UE, upon receipt of packet data at a certain time, can determine the logical channel that transmitted the packet data. Thus, the UE can rearrange packet data in the right reception order or soft-combine the packet data.

Now, an operation of the n-channel SAW HARQ will be described in detail with reference to FIG. 4. First, it will be assumed that 4-channel SAW HARQ is used between the UE 430 and the Node B 423, and the 4 channels are assigned unique logical identifiers #1 to #4. Physical layers of the UE 430 and the Node B 423 have HARQ processors associated with the respective channels. The Node B 423 assigns a channel identifier #1 to an initially transmitted coded block (which means user data transmitted for one TTI (Transmission Time Interval)) before transmission to the UE 430. Here, the channel identifier can be assigned either specifically or suggestively. When the coded block assigned the channel identifier #1 has a transmission error, the UE 430 delivers the defective coded block to an HARQ processor #1 associated with the channel identifier #1, and transmits a NACK (Negative Acknowledgement) signal for a channel #1 to the Node B 423. Then the Node B 423 can transmit the next coded block over a channel #2, regardless of whether an ACK for the coded block on the channel #1 is received or not. If the next coded block also has an error, the Node B 423 delivers the next coded block to the corresponding HARQ processor. Upon receiving a NACK for the coded block on the channel #1 from the UE 430, the Node B 423 retransmits the corresponding coded block over the channel #1, and the UE 430 recognizes retransmission of the coded block previously transmitted over the channel #1 by analyzing the channel identifier of the retransmitted coded block, and delivers the retransmitted coded block to the HARQ processor #1. Upon receiving the retransmitted coded block, the HARQ processor #1 soft-combines the initially transmitted coded block stored therein with the retransmitted coded block. In this way, the n-channel SAW HARQ matches the channel identifiers with the HARQ processors on a one-to-one basis, thereby properly matching initially transmitted coded blocks with retransmitted coded blocks without a delay in transmitting user data until an ACK is received.

In the n-channel SAW HARQ, a channel identifier indicates whether a receiver performs soft combining received coded block and a coded block which stored in a HARQ processor or not. The channel identifier can be transmitted from a transmitter to the receiver along with the coded block, and this technique is called "asynchronous n-channel SAW HARQ."

Next, a channel structure of a communication system supporting the HSDPA (hereinafter, referred to as "HSDPA communication system") will be described.

The HSDPA communication system includes a plurality of control channels and one data channel in order to support the AMC and the HARQ, and will be described in detail herein below.

Downlink channels of the HSDPA communication system include Associated DPCH, SHCCH (Shared Control Channel), and HS-PDSCH (High Speed-Physical Downlink Shared Channel). The HS-PDSCH is a physical channel for transmitting actual user data, and is comprised of OVSF codes with a spreading factor (SF) 16 (SF=16). Further, each TTI, a transmission unit of the user data, is comprised of 3 time slots (1 TTI=3 time slots). That is, a coded block is transmitted to a particular UE for 3 time slots. As described above, a modulation technique and a channel coding technique applied to the HS-PDSCH are determined according to the channel quality between the corresponding UE and Node B. The HS-PDSCH is a common resource shared by a plurality of UEs, and can be accessed by the UEs on the basis of CDMA (Code Division Multiple Access) or TDMA (Time Division Multiple Access) technology. That is, the UEs can be assigned OVSF codes constituting the HS-PDSCH at a certain point of time (CDMA), and the UEs intermittently use the HS-PDSCH resource (TDMA). For example, UE A can be assigned 10 codes and UE B can be assigned 5 codes at time T_1, while UE C can be assigned 8 codes and UE D can be assigned 8 codes at time T_2.

The SHCCH is a channel for transmitting control information needed by UE to receive the HS-PDSCH. The control information included in the SHCCH includes code assignment information, modulation technique, TBS (Transport Block Set) size, and HARQ channel number. The TBS is a set of transport blocks (TBs) transmitted for one TTI. The TB is a basic unit in which an upper layer of a physical layer processes data. For example, if a size of TB is 300 bits, the upper layer transmits data to the physical layer by 300 bits. A plurality of SHCCHs may exist in each HSDPA system, and the SHCCHs undergo code division. At a certain point in time, the number of UEs using the HS-PDSCH is closely related to the number of SHCCHs. For example, if the HSDPA system provides the HS-PDSCH to four UEs at once, the HSDPA system must include 4 SHCCHs.

The Associated DPCH is a channel for transmitting HSDPA indicator (HI), an identifier of an SHCCH. The Associated DPCH, though it has the same structure as the existing DPCH, punctures, when necessary, a part of the user data transmitted over DPDCH (Dedicated Physical Data Channel), and then inserts the HI in the punctured space, before being transmitted to a corresponding UE. More specifically, the HI has a 2-bit structure corresponding to a logical identifier of the SHCCH, and since DPCCH (Dedicated Physical Control Channel) of the existing DPCH does not have a space for receiving the HI, the DPDCH is unavoidably subject to puncturing to insert the HI in the punctured space. Although the number of SHCCHs that can be included in each system is not restricted, the number of SHCCHs that must be monitored by each UE is limited to 4. Therefore, the 2 bits constituting the HI serve as an identifier indicating each SHCCH.

Above, the downlink channels of Associated DPCH, SHCCH, and HS-PDSCH have been described. Next, a description will be made of an uplink channel. The uplink channel includes Secondary DPCH for transmitting feedback information (FBI) that must be periodically transmitted from a UE to a Node B. The feedback information includes channel quality information based on which the Node B determines an MCS level of the corresponding UE, and ACK/NACK information indicating whether a received coded block has an error.

FIG. 5 is a flow diagram illustrating a process of setting up an HSDPA call in a conventional HSDPA communication system. Specifically, FIG. 5 illustrates a signal flow for setting up an HSDPA call among a UE, a Node B, an RNC and a CN. In FIG. 5, ellipses represent protocol entities for transmitting and receiving messages. The types of IEs that must be included in the messages are illustrated in Table 2. For simplicity, Table 2 shows only the IEs that should be newly added for the HSDPA. Further, Table 1 shows references that provide a full list of the corresponding IE.

TABLE 2

| Message | Reference |
|---|---|
| 501 RRC CONNECTION REQUEST | 3GPP TS 25.331 v4.1.0 ch 10.2.40 |
| 502 RRC CONNECTION SETUP | 3GPP TS 25.331 v4.1.0 ch 10.2.41 |
| 503 RRC CONNECTION SETUP COMPLETE | 3GPP TS 25.331 v4.1.0 ch 10.2.42 |
| 504 INITIAL DIRECT TRANSFER | 3GPP TS 25.331 v4.1.0 ch 10.2.12 |
| 505 INITIAL UE MESSAGE | 3GPP TS 25.413 v4.1.0 ch 9.1.33 |
| 506 RAB ASSIGNMENT REQUEST | 3GPP TS 25.413 v4.1.0 ch 9.1.3 |
| 507 RADIO LINK SETUP REQUEST | 3GPP TS 25.433 v4.1.0 ch 9.1.36 |
| 508 RADIO LINK SETUP RESPONSE | 3GPP TS 25.433 v4.1.0 ch 9.1.37 |
| 509 RADIO BEARER SETUP | 3GPP TS 25.331 v4.1.0 ch 10.2.31 |
| 510 RADIO BEARER SETUP COMPLETE | 3GPP TS 25.331 v4.1.0 ch 10.2.32 |
| 511 RAB ASSIGNMENT RESPONSE | 3GPP TS 25.413 v4.1.0 ch 9.1.4 |

Now, a process of setting up an HSDPA call by the UE will be described with reference to FIG. 5 and Table 2.

If UE enters a particular cell, the UE acquires necessary system information (SI) through a cell selection process, and then transmits an RRC Connection Request message to corresponding RNC (Step 501). Here, the "cell selection process" is a process of adjusting synchronization with a corresponding cell using CPICH and PCCPCH of the cell, and then acquiring RACH information. The RRC Connection Request message has UE identity IE inserted therein so that the RNC can determine whether to approve RRC connection setup to the corresponding UE. The RRC connection normally means signaling connection for transmitting necessary information to a network after the UE initially accesses the system. However, in some cases, a dedicated physical channel (DPCH) for transmitting user data is included in the RRC connection. It will be assumed in FIG. 5 that the RRC Connection Request message includes only a signaling connection setup request.

Upon receiving the RRC Connection Request message, RNC determines whether to approve RRC connection to the corresponding UE based on UE identity IE, and then transmits an RRC Connection Setup message with IEs related to RRC connection to the UE, in order to approve the RRC connection (Step 502). The RRC Connection Setup message includes UE ID (Identifier) to be used by the UE for such common channels as RACH and FACH (Forward Access Channel). Upon receiving the RRC Connection Setup message, the UE transmits an RRC Connection Setup Complete message to the RNC along with UE radio access capability IE (Step 503). Commonly, the UE radio access capability IE includes a physical channel capability item and a turbo coding item. Herein, the UE radio access capability IE includes information indicating whether the corresponding UE supports HS-PDSCH reception. In addition, the RRC Connection Setup Complete message includes information indicating whether the UE supports inter-frequency handover. Upon receiving the RRC Connection Setup Complete message, the RNC stores the UE-related information.

After completing RRC connection setup, the UE, when necessary, transmits a message for requesting new call setup to NC (Step 504). Here, the message for requesting new call setup is transmitted along with NAS (Non-Access Stratum) message IE in an RRC Initial Direct Transfer message. The NAS message may include information needed by the CN to perform a corresponding call, i.e., include call quality-related information. Therefore, as the UE transmits an Initial Direct Transfer message to the RNC, the RNC converts the message to an RANAP (Radio Access Network Application Part) message of Initial UE message, and transmits the Initial UE message to the CN (Step 505). Upon receiving the Initial UE message, the CN determines a RAB (Radio Access Bearer) parameter based on quality-related information on NAS message IE included in the Initial UE message. The RAB parameter includes a maximum bit rate and a guaranteed bit rate of a corresponding call, and a traffic class indicating the type of the call. The traffic class includes conversational class, streaming class, interactive class, and background class. The conversational class and streaming class chiefly correspond to a multimedia service including a real-time voice call service, and the interactive class and background class chiefly correspond to a non-real-time data service. Therefore, if a call requested by the UE in the steps 504 and 505 is a data service, the CN will apply the interactive class or background class to the RAB parameter. However, if the requested call is a voice service, the CN will apply the conversational class to the RAB parameter. After determining the RAB parameter, the CN transmits a RAB Assignment Request message to the RNC (Step 506). The RNC then determines a channel to be set up to the corresponding UE, based on RAB parameter included in the RAB Assignment Request message. If the RAB parameter indicates that a call to be set up is a high-speed data service, i.e., if traffic class of the RAB parameter is the interactive class or background class having a very high maximum bit rate, the RNC can set up the call as an HSDPA call.

Upon receiving the RAB Assignment Request message, the RNC transmits a Radio Link Setup Request message to Node B, which manages the corresponding call (Step 507). The present invention newly defines an HS-DSCH info IE in the Radio Link Setup Request message, and the HS-DSCH info IE includes UE ID and other UE-related information. In addition, the Radio Link Setup Request message must include the Associated DPCH and Secondary DPCH-related information as well. The DPCH-related information may include OVSF code information, and further include activation time-related information indicating the time when the DPCHs will be activated. Upon receiving the Radio Link Setup Request message, the Node B stores the UE ID included in the Radio Link Setup Request message, and then assigns a buffer for servicing the corresponding UE. After completion of forming the DPCHs, the Node B transmits a Radio Link Setup Response message to the RNC (Step 508). Upon receiving the Radio Link Setup Response message, the RNC transmits a Radio Bearer Setup message to the UE (Step 509). The Radio Bearer Setup message includes the DPCH-related information and the information to be perceived by the UE for the HSDPA, i.e., information on the number of HARQ processors, the number of SHCCHs, and OVSF codes for the SHCCHs. Upon receiving the Radio Bearer Setup message, the UE forms the DPCHs, and then transmits a Radio Bearer Setup Complete message to the RNC, thus informing completion of preparing to receive HS-PDSCH (Step 510). The RNC then transmits an RAB Assignment Response message to the CN, informing completion of the call setup (Step 511).

The Node B registers, in an UE list, UEs that are setting up an HSDPA call in a cell managed by the Node B. The UE list can be updated, when the Node B receives the Radio Link Setup Request message. In addition, the Node B manages buffers for servicing the UEs, and manages channel quality information periodically reported by the UEs in association with the UEs. For the sake of convenience, the UE list and the channel quality information will be defined as a "UE context." Table 3 illustrates an example of the UE context.

TABLE 3

| UE ID | UD ID transmitted by RNC |
|---|---|
| Channel Quality | Channel quality fed back by UE, or strength of PCPICH from a corresponding cell, measured by UE |
| Buffer Status | Amount of data stored in a buffer assigned to a corresponding UE |
| Service History | Amount of data serviced by a corresponding UE for the latest reference time |
| Etc. | Multi-code capability of UE, and modulation technique supported by UE |

In Table 3, "reference time" of a Service History item represents a period determined by the Node B or RNC, and is used for scheduling by the Node B. This will be described in detail later. Further, in Table 3, "multi-code capacity" is information indicating the number of OVSF codes that can be simultaneously despread by a corresponding UE: For example, if the number of OVSF codes that can be simultaneously despread by a particular UE, i.e., the multi-code capacity is 8, then the Node B does not assign more than 8 OVSF codes to the corresponding UE. In Table 3, a "modulation technique" supported by UE is used by the Node B to assign an MCS level to the corresponding UE. For example, if the UE supports only QPSK (Quadrature Phase Shift Keying), the Node B assigns only an MCS level where the QPSK is included, to the corresponding UE.

Therefore, the Node B performs scheduling every TTI, using the UE context. Here, the "scheduling" by the Node B is a process of determining (i) a particular UE to which OVSF codes will be assigned for a certain TTI, and (ii) the number of the OVSF codes assigned to the UE. There are several scheduling methods. For example, the Node B can have a scheduling algorithm for calculating the number of OVSF codes to be assigned to a particular UE by receiving the Channel Quality (CQ), Buffer Status (BS), and Service History (SH).

FIG. 6 schematically illustrates a scheduling algorithm for a Node B in a conventional HSDPA communication system. Referring to FIG. 6, the Node B receives CQ, BS, and SH from each of all UEs, which are maintaining an HSDPA call at a particular point of time, and based on the received information, determines (i) UEs that will receive HS-PDSCH for TTI#n, (ii) the type and number of codes to be assigned to each of the UEs, and (iii) SHCCH for transmitting various control information, and then outputs the determined information. The scheduling algorithm has such input and output information. The input and output information of the scheduling algorithm is adaptively determined according to circumstances. For example, if the UEs that will receive HS-PDSCH are first determined in the order of the UE having a best CQ, then the Node B may assign the codes by consulting BSs from the determined UEs. Alternatively, the Node B may first transmit HS-PDSCH to UEs that have not recently received the HS-PDSCH, by consulting the SH.

FIG. 7 illustrates a structure of a Node B transceiver in a conventional HSDPA communication system. It will be assumed in FIG. 7 that the Node B supports a total of n SHCCHs, and a total of x UEs maintain an HSDPA call. If DPCH receivers 701-1 to 701-x of the Node B receive uplink Secondary DPCHs of UE#1 to UE#x, the DPCH receivers 701-1 to 701-x deliver control information included in the received Secondary DPCHs to corresponding UE context storages 702-1 to 702-x, respectively. Further, the DPCH receivers 701-1 to 701-x deliver HARQ-related information such as HARQ processor numbers and ACK/NACK information included in the received Secondary DPCHs to corresponding buffers 703-1 to 703-x, respectively. The buffers 703-1 to 703-x store user data that is received by the Node B from RNC and is to be transmitted to the corresponding UEs, and data for which the Node B has failed to receive ACK. The buffers 703-1 to 703-x provide information on an amount of the stored data to the corresponding UE context storages 702-1 to 702-x every TTI. The UE context storages 702-1 to 702-x manage the information illustrated in Table 3 in association with the UEs, and continuously update the contents stored therein based on control information included in the received Secondary DPCHs. Further, the UE context storages 702-1 to 702-x provide the updated contexts of the UE contexts to a scheduler 704 every TTI. By using a predetermined scheduling algorithm, the scheduler 704 determines (i) a particular UE to which HS-PDSCH resources, or OVSF codes are to be assigned for a particular TTI, (ii) the number of the OVSF codes to be assigned to the UE, (iii) an MCS level to be applied, and (iv) SHCCH to be used. The scheduler 704 determines the MCS level based on CQ information provided to the UE context storages 702-1 to 702-x. Further, the scheduler 704 provides information on the number of codes and the MCS level to buffers 703-1 to 703-x for the UEs assigned the HS-PDSCH resources, an HS-PDSCH transmitter 707, and SHCCH transmitters 706-0 to 706-n. In addition, the buffers 703-1 to 703-x for the UEs store an identifier of SHCCH for transmitting control information of the corresponding UEs. The buffers 703-1 to 703-x for the UEs transmit HARQ-related information such as HARQ processor number for transmission data over a corresponding SHCCH, determine an amount of transmission data based on the number of codes and the MCS level, and then provide as much data as the determined amount to the HS-PDSCH transmitter 707. The scheduler 704 provides the SHCCH identifier to DPCH transmitters 705-1 to 705-x at a time earlier than a point of time when the HS-PDSCH transmits data. The time when the scheduler 704 provides the SHCCH identifier to the DPCH transmitters 705-1 to 705-x will be described later. The DPCH transmitters 705-1 to 705-x insert the SHCCH identifier provided from the scheduler 704 in a punctured part of the corresponding DPCHs before transmission. If no SHCCH identifier was provided from the scheduler 704, the DPCH transmitters 705-1 to 705-x transmit corresponding DPCHs without the SHCCH identifier. The SHCCH transmitters 706-0 to 706-n form SHCCHs based on the information provided from the scheduler 704 and the buffers 703-1 to 703-x, and then transmit the formed SHCCHs over a radio channel. The HS-PDSCH transmitter 707 performs channel coding, modulation and spreading on the data provided from the buffers 703-1 to 703-x based on the code information and MCS level provided from the scheduler 704, and transmits the processed data over a radio channel.

FIG. 8 illustrates a timing relationship among channels in a general HSDPA communication system. Referring to FIG. 8, if HI and control information are transmitted over downlink DPCH (DL_DPCH) and SHCCH, respectively, then the UE identifies an SHCCH identifier corresponding to the UE through HI on the DL_DPCH, receives an SHCCH signal corresponding to the SHCCH identifier, and detects control information from the received SHCCH signal. After a lapse of predetermined time, the UE receives HS-PDSCH based on the control information on the SHCCH. Here, the "predetermined time" represents the time required for analyzing control information, or code information for HS-PDCH, included in the SHCCH signal, and despreading the HS-PDSCH with the analyzed code. Preferably, the predetermined time is set to a 2-time slot period. After receiving the HS-PDSCH, the UE sequentially performs despreading, demodulation, decoding, and CRC operation on a coded block received over the HS-PDSCH. As a result of the CRC operation, the UE determines whether the coded block has an error, and transmits the CRC results to Node B over an uplink DPCH (UL_DPCH).

Herein, for the convenience of explanation, the time required by the UE for performing despreading, demodulation, decoding, and CRC operation on the received coded block and transmitting the CRC result information, or ACK/NACK information, to the Node B will be referred to as "feedback delay." Since the feedback delay is the sum of a propagation delay representing the time required when a coded block transmitted by the Node B arrives at the UE, and the time required when the UE actually processes the received coded block, the feedback delay is changed according to a channel condition. However, since the Node B must previously know the time when the ACK/NACK information will arrive, the feedback delay may be determined by the HSDPA communication system and transmitted to the UE during HSDPA call setup. In this case, since the feedback delay is a value previously agreed between the UE and the Node B, both the UE and the Node B must previously recognize the feedback delay.

For the sake of convenience, it is assumed in FIG. 8 that the feedback delay has a 3-time slot period, the DL_DPCH represents Associated DPCH, and the UL_DPCH represents Secondary DPCH. As illustrated in FIG. 8, a process of transmitting a particular HS-PDSCH to a particular UE continues from the time where the Node B transmits HI until the Node B receives ACK/NACK from the corresponding UE. Herein, the time required for performing the process of transmitting a particular HS-PDSCH to a particular UE will be referred to as "HSDPA cycle." In addition, a period from a transmission starting point of the HI to a transmission ending point of the HS-PDSCH will be defined as "DL cycle," and a period from a transmission ending point of the HS-PDSCH to a transmission ending point of ACK/NACK will be defined as "UL cycle." That is, the DL cycle becomes a downlink transmission period in the HSDPA cycle, and the UL cycle becomes an uplink transmission period in the HSDPA cycle. Further, though not illustrated, scheduling for transmission of the HS-PDSCH must be ended before the transmission starting point of the HI.

FIG. 9 schematically illustrates an operation of performing a compressed mode by UE maintaining an HSDPA call. Referring to FIG. 9, the DL_DPCH and the UL_DPCH are required in order to support the HSDPA, and a connection such as a voice call service except the HSDPA call can be set up through the DL_DPCH. For the connection established over the DL_DPCH, the UE may perform either inter-frequency measurement or the compressed mode. As described above, if the compressed mode is performed, transmission gaps are generated, and during the transmission gap, since transmission/reception of HSDPA data is impossible, transmission/reception of HS, SHCCH and HS-PDSCH is also impossible. In addition, even when the HSDPA cycle overlaps with the transmission gap, the normal HSDPA call cannot be maintained. Therefore, it is necessary to prevent the HSDPA cycle from overlapping with the transmission gap. The HSDPA call is not serviceable for the transmission gap and also for a period determined by subtracting one time slot from the HSDPA cycle before the transmission gap. For example, when the HSDPA cycle has 8 time slots, if HI was transmitted before a $7^{th}$ time slot preceding the transmission gap, it may not be possible to receive from the UE an ACK/NACK signal for a coded block corresponding to the HI. The period where the HSDPA call cannot be serviced due to the transmission gap in the compressed mode of the DPCH will be defined as "HSDPA non-transmittable period." Accordingly, there have been demands for a method capable of minimizing the HSDPA non-transmittable period.

SUMMARY OF THE INVENTION

It is, therefore, an object of the present invention to provide an apparatus and method for minimizing a non-transmittable period for an HSDPA call during execution of a compressed mode in an HSDPA mobile communication system.

It is another object of the present invention to provide an apparatus and method for maximizing an HSDPA capacity by minimizing a non-transmittable period due to execution of a compressed mode in an HSDPA mobile communication system.

To achieve the above and other objects, there is provided an apparatus for minimizing a non-transmittable period in which high-speed packet data transmission by a first Node B is impossible, in a mobile communication system including a first Node B, a UE located in a cell occupied by the first Node B, and a second Node B neighboring to the first Node B, wherein the system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap needed by the UE to acquire second Node B information necessary for a handover to the second Node B when the UE enters a handover region indicating a common region between the first Node B and the second Node B. The apparatus comprises a non-transmittable period calculator for receiving transmission gap-related information for the UE from a radio network controller, calculating a transmission gap starting point based on the transmission gap-related information, defining a period determined by excluding the downlink transmission period from the transmission gap starting point as the non-transmittable period, and suspending transmission of the high-speed packet data to the UE for the non-transmittable period; and a scheduler for performing scheduling on the high-speed packet data under the control of the non-transmittable period calculator so that transmission of the high-speed packet data to the UE is suspended for the downlink transmission period.

To achieve the above and other objects, there is provided an apparatus for minimizing a non-receptible period in which high-speed packet data reception by a UE is impossible, in a mobile communication system including a first Node B, the UE located in a cell occupied by the first Node B, and a second Node B neighboring to the first Node B, wherein the system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap needed by the UE to acquire second Node B information necessary for a handover to the second Node B when the UE enters a handover region indicating a common region between the first Node B and the second Node B. The apparatus comprises a scheduler for receiving transmission gap-related information for the UE from a radio network controller, and calculating a transmission gap starting point and a non-receptible period corresponding to the transmission gap based on the transmission gap-related information, and calculating a delayed acknowledgement signal transmission period by excluding the downlink transmission period and the uplink transmission period from the transmission gap starting point; and a transmitter for transmitting an acknowledgement signal for the high-speed packet data received from the first Node B, for a period between a starting point of the delayed acknowledgement signal transmission period and a starting point of the non-receptible period.

To achieve the above and other objects, there is provided a method for minimizing a non-transmittable period in which high-speed packet data transmission by a first Node B is impossible, in a mobile communication system including a first Node B, a UE located in a cell occupied by the first Node B, and a second Node B neighboring to the first Node B, wherein the system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap needed by the UE to acquire second Node B information necessary for a handover to the second Node B when the UE enters a handover region indicating a common region between the first Node B and the second Node B. The method comprises receiving transmission gap-related information for the UE from a radio network controller, and calculating a transmission gap starting point based on the transmission gap-related information, and defining a period determined by excluding the downlink transmission period from the transmission gap starting point as the non-transmittable period, and suspending transmission of the high-speed packet data to the UE for the non-transmittable period.

To achieve the above and other objects, the present invention provides a method for minimizing a non-receptible period in which high-speed packet data reception by a UE is impossible, in a mobile communication system including a first Node B, the UE located in a cell occupied by the first Node B, and a second Node B neighboring to the first Node B, wherein the system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap needed by the UE to acquire second Node B information necessary for a handover to the second Node B when the UE enters a handover region indicating a common region between the first Node B and the second Node B. The method comprises receiving transmission gap-related information for the UE from a radio network controller, and calculating a transmission gap starting point and a non-receptible period corresponding to the transmission gap based on the transmission gap-related information; calculating a delayed acknowledgement signal transmission period by excluding the downlink transmission period and the uplink transmission period from the transmission gap starting point; and upon receiving the high-speed packet data from the first Node B, transmitting an acknowledgement signal for the high-speed packet data for a period between a starting point of the delayed acknowledgement signal transmission period and a starting point of the non-receptible period.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 9:
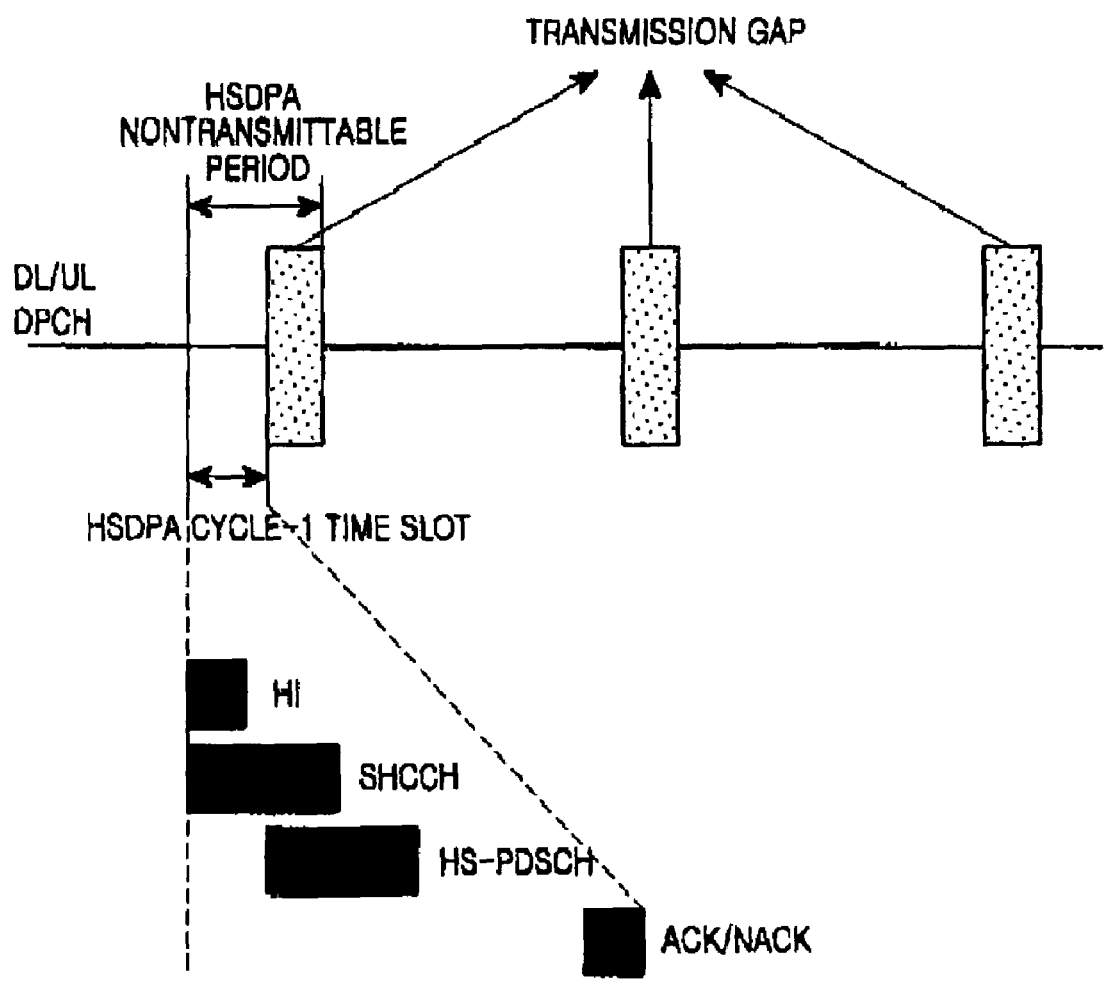
FIG. 9 schematically illustrates an operation of performing a compressed mode by UE maintaining an HSDPA call.

The present invention provides a method for minimizing an HSDPA non-transmittable period, a period where a UE (User Equipment) performing an HSDPA call cannot receive an HSDPA service due to a transmission gap in a process of performing a compressed mode in an HSDPA (High Speed Packet Downlink Packet Access) communication system, as illustrated in FIG. 9. In particular, the present invention provides a method for minimizing the HSDPA non-transmittable period by excluding a period occupied by a UL cycle from the HSDPA non-transmittable period.

Figure 8:
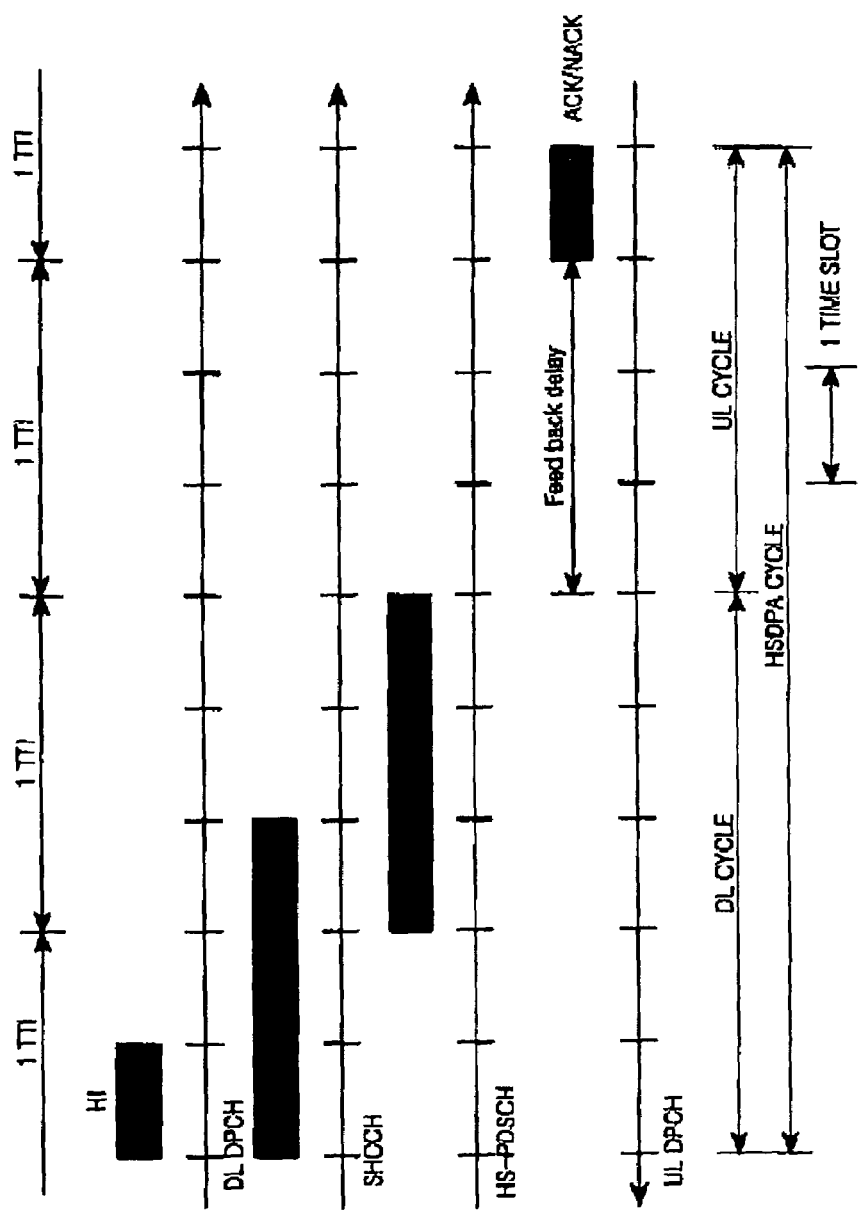
FIG. 8 illustrates a timing relationship among channels in a conventional HSDPA communication system.

First, as illustrated in FIG. 8, the UL cycle is a period from a transmission ending point of an HS-PDSCH (High Speed-Physical Downlink Shared Channel) signal to a transmission ending point of an ACK/NACK (Acknowledgement/Negative Acknowledgement) signal by the UE. If transmission of the ACK/NACK signal is delayed up to an ending point of the transmission gap, reception of the HS-PDSCH can be achieved without failure. More specifically, when a compressed mode is performed on a particular UE, if the Node B and the UE have agreed to transmit the ACK/NACK signal, when necessary, after an end of the transmission gap in the compressed mode, then the UE can receive an HS-PDSCH signal until the transmission gap is started, perform inter-frequency measurement for the transmission gap, and transmit an ACK/NACK signal for a coded block received over the HS-PDSCH.

Figure 10:
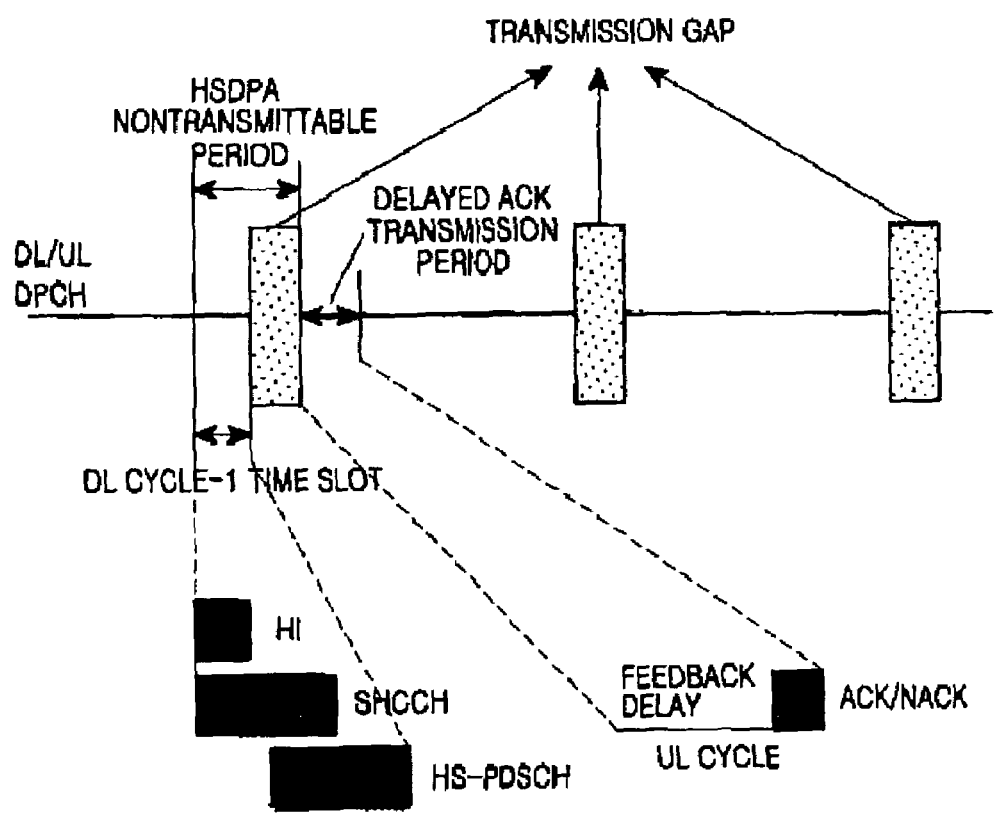
FIG. 10 schematically illustrates an operation of performing a compressed mode by UE maintaining an HSDPA call according to an embodiment of the present invention.

FIG. 10 schematically illustrates an operation of performing a compressed mode by UE maintaining an HSDPA call according to an embodiment of the present invention. Referring to FIG. 10, if the UE transmits an ACK/NACK signal for a received coded block after an end of the transmission gap, a size of the HSDPA non-transmittable period is reduced from the existing [(DL cycle)+(UL cycle)−(1 time slot)] to [(DL cycle)−(1 time slot)]. Therefore, the present invention proposes a Node B transceiver structure for assigning HS-PDSCH to a corresponding UE taking into account a position of a transmission gap when the transmission gap occurs in DPCH (Dedicated Physical Channel) of a particular UE, and a UE and Node B transceiver structure for delaying transmission and reception of an ACK/NACK signal when the UL cycle overlaps with the transmission gap.

First, a Node B transceiver structure for assigning HS-PDSCH transmission resources taking the transmission gap into account will be described with reference to FIG. 11.

Figure 11:
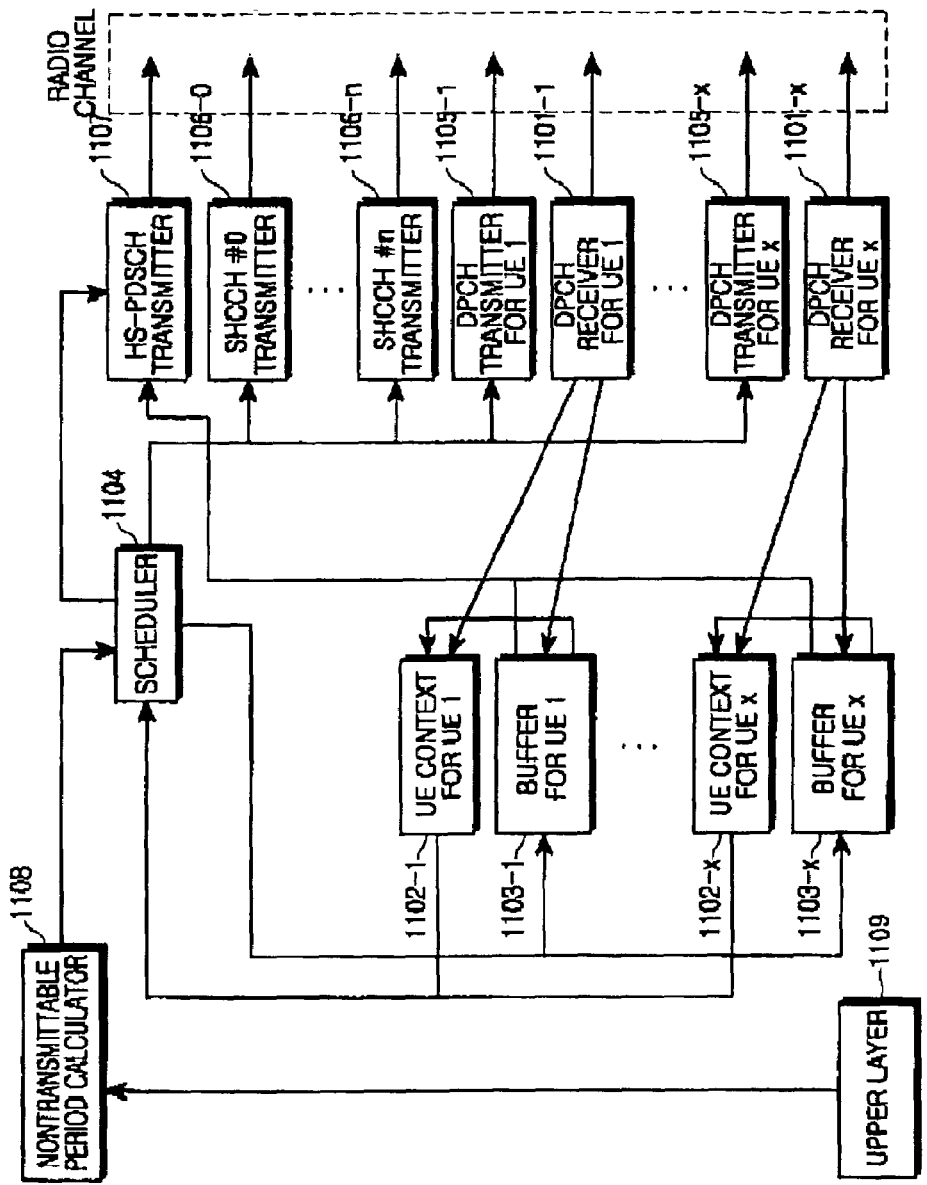
FIG. 11 illustrates a Node B transceiver according to an embodiment of the present invention.

FIG. 11 illustrates a Node B transceiver structure according to an embodiment of the present invention. It will be assumed in FIG. 11 that the Node B supports a total of n SHCCHs (Shared Control Channels), and a total of x UEs maintain an HSDPA call.

If DPCH receivers 1101-1 to 1101-x of the Node B receive uplink Secondary DPCHs of UE#1 to UE#x, the DPCH receivers 1101-1 to 1101-x deliver control information included in the received Secondary DPCHs to corresponding UE context storages 1102-1 to 1102-x, respectively. Further, the DPCH receivers 1101-1 to 1101-x deliver HARQ-related information such as HARQ (Hybrid Automatic Retransmission Request) processor numbers and ACK/NACK information included in the received Secondary DPCHs to corresponding buffers 1103-1 to 1103-x, respectively. The buffers 1103-1 to 1103-x store user data that is received by the Node B from the RNC (Radio Network Controller) and is to be transmitted to the corresponding UEs, and data for which the Node B has failed to receive the ACK. The buffers 1103-1 to 1103-x provide information on an amount of the stored data to the corresponding UE context storages 1102-1 to 1102-x every TTI (Transmission Time Interval). The UE context storages 1102-1 to 1102-x manage the information illustrated in Table 3 in association with the UEs, and continuously update the contents stored therein based on control information included in the received Secondary DPCHs. Further, the UE context storages 1102-1 to 1102-x provide the updated contexts of the UE contexts to a scheduler 1104 every TTI. By using a predetermined scheduling algorithm, the scheduler 1104 determines (i) a particular UE to which HS-PDSCH resources, or OVSF (Orthogonal Variable Spreading Factor) codes are to be assigned for a particular TTI, (ii) the number of the OVSF codes to be assigned to the UE, (iii) an MCS level to be applied, and (iv) SHCCH to be used.

Of the above-stated information, the HS-PDSCH resources assigned to the UE are determined by consulting data provided from a non-transmittable period calculator 1108. A detailed description of the non-transmittable period calculator 1108 will be made later. The MCS level is determined based on CQ (Channel Quality) information provided from the UE context storages 1102-1 to 1102-x. Further, the particular TTI represents a particular period to come, and a scheduling operation for a particular HSDPA cycle must be determined before the HSDPA cycle is started. In addition, since the HSDPA cycle is continuously repeated, a scheduling operation related to the HSDPA cycle is performed with a predetermined time offset (or time difference). The present invention defines the time offset as "scheduling delay." Therefore, the particular TTI is an HSDPA cycle after the scheduling delay at a corresponding point of time. The scheduler 1104 provides information on the number of codes and the MCS level to buffers 1103-1 to 1103-x for the UEs assigned the HS-PDSCH resources, an HS-PDSCH transmitter 1107, and SHCCH transmitters 1106-0 to 1106-n.

In addition, the buffers 1103-1 to 1103-x for the UEs are provided with an identifier of SHCCH for transmitting control information of the corresponding UEs. The buffers 1103-1 to 1103-x for the UEs transmit HARQ-related information such as HARQ processor number for transmission data to the corresponding SHCCH transmitters 1106-1 to 1106-n, respectively, determine an amount of transmission data based on the number of codes and the MCS level, and then provide as much data as the determined amount to the HS-PDSCH transmitter 1107. Meanwhile, the scheduler 1104 provides the SHCCH identifier to DPCH transmitters 1105-1 to 1105-x at a time earlier than when the buffers 1103-1 to 1103-x for the UEs transmit data over the HS-PDSCH. In FIG. 8, because there is a time offset of 2 time slots between SHCCH and HS-PDSCH, the time point where the SHCCH identifier is transmitted to the DPCH transmitters 1105-1 to 1105-x comes 2 time slots earlier than the time point where the buffers 1103-1 to 1103-x for the UEs transmit data to the HS-PDSCH transmitter 1107. The DPCH transmitters 1105-1 to 1105-x insert the SHCCH identifier provided from the scheduler 1104 in a punctured part of the corresponding DPCHs before transmission. If no SHCCH identifier was provided from the scheduler 1104, the DPCH transmitters 1105-1 to 1105-x transmit corresponding DPCHs without the SHCCH identifier. The SHCCH transmitters 1106-0 to 1106-n form SHCCHs based on the information provided from the scheduler 1104 and the buffers 1103-1 to 1103-x, and then transmit the formed SHCCHs over a radio channel. The HS-PDSCH transmitter 1107 performs channel coding, modulation and spreading on the data provided from the buffers 1103-1 to 1103-x based on the code information and MCS level provided from the scheduler 1104, and transmits the processed data over a radio channel.

An upper layer 1109 provides TGP1 (Transmission Gap Pattern #1) and TGP2 (Transmission Gap Pattern #2)-related information, TGPRC (Transmission Gap Pattern Repetition Counter), TGSN (Transmission Gap Starting Slot Number), and TGCFN (Transmission Gap Connection Frame Number) to the non-transmittable period calculator 1108, when the compressed mode is activated (or performed) by a particular UE. Here, the TGP1 and TPG2-realted information, as described in conjunction with the prior art, may include TGL1, TGL2, and TGD (Transmission Gap Distance). The non-transmittable period calculator 1108 calculates the HSDPA non-transmittable period and a delayed ACK period in accordance with UEs with the compressed mode activated, based on the information received from the upper layer 1109.

The non-transmittable period calculator 1108 first calculates positions of the transmission gaps in the following manner.

Figure 1:
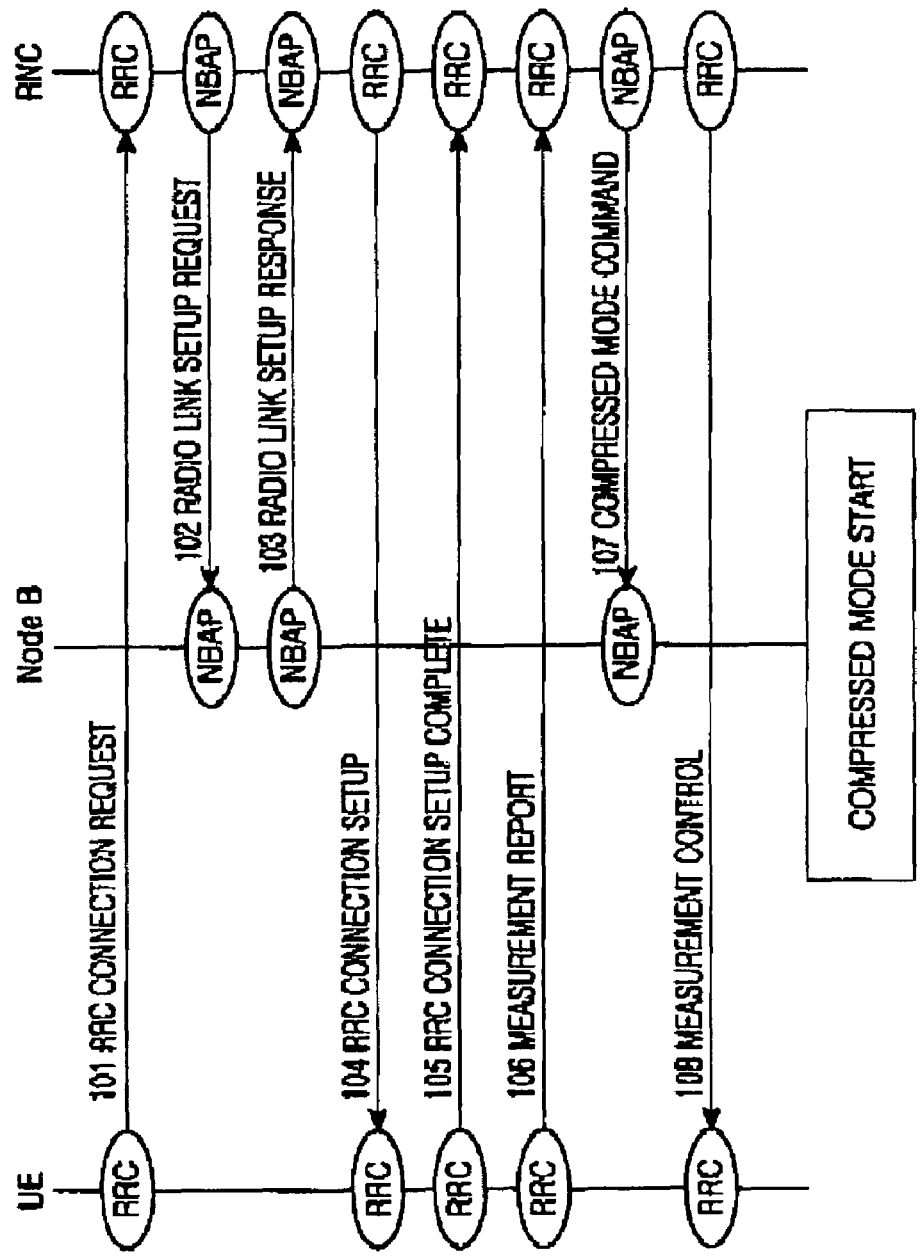
FIG. 1 is a flow diagram illustrating a process of performing a compressed mode in a conventional UMTS communication system.
Figure 2:
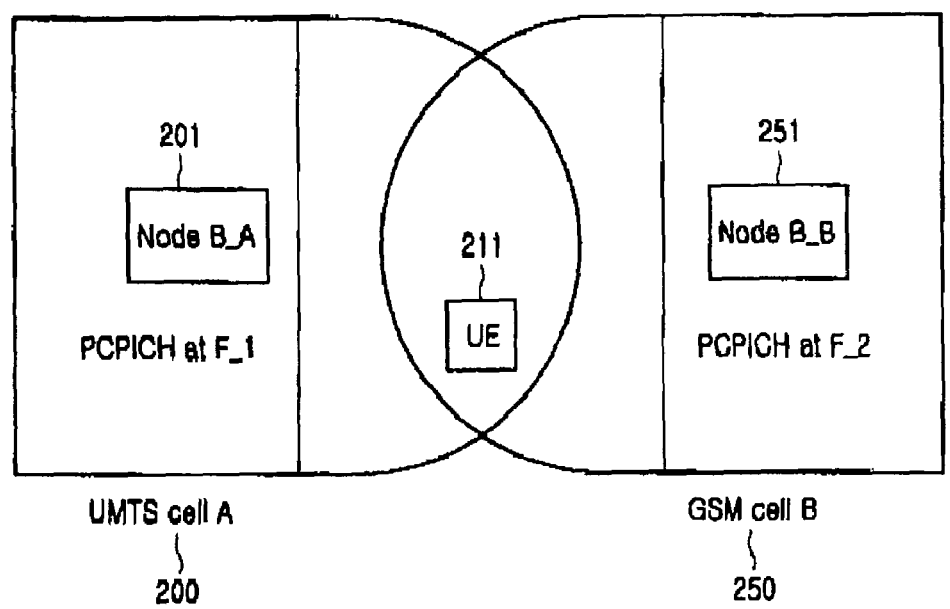
FIG. 2 schematically illustrates a state in which an inter-frequency measurement is required in a conventional UMTS communication system.
Figure 3:
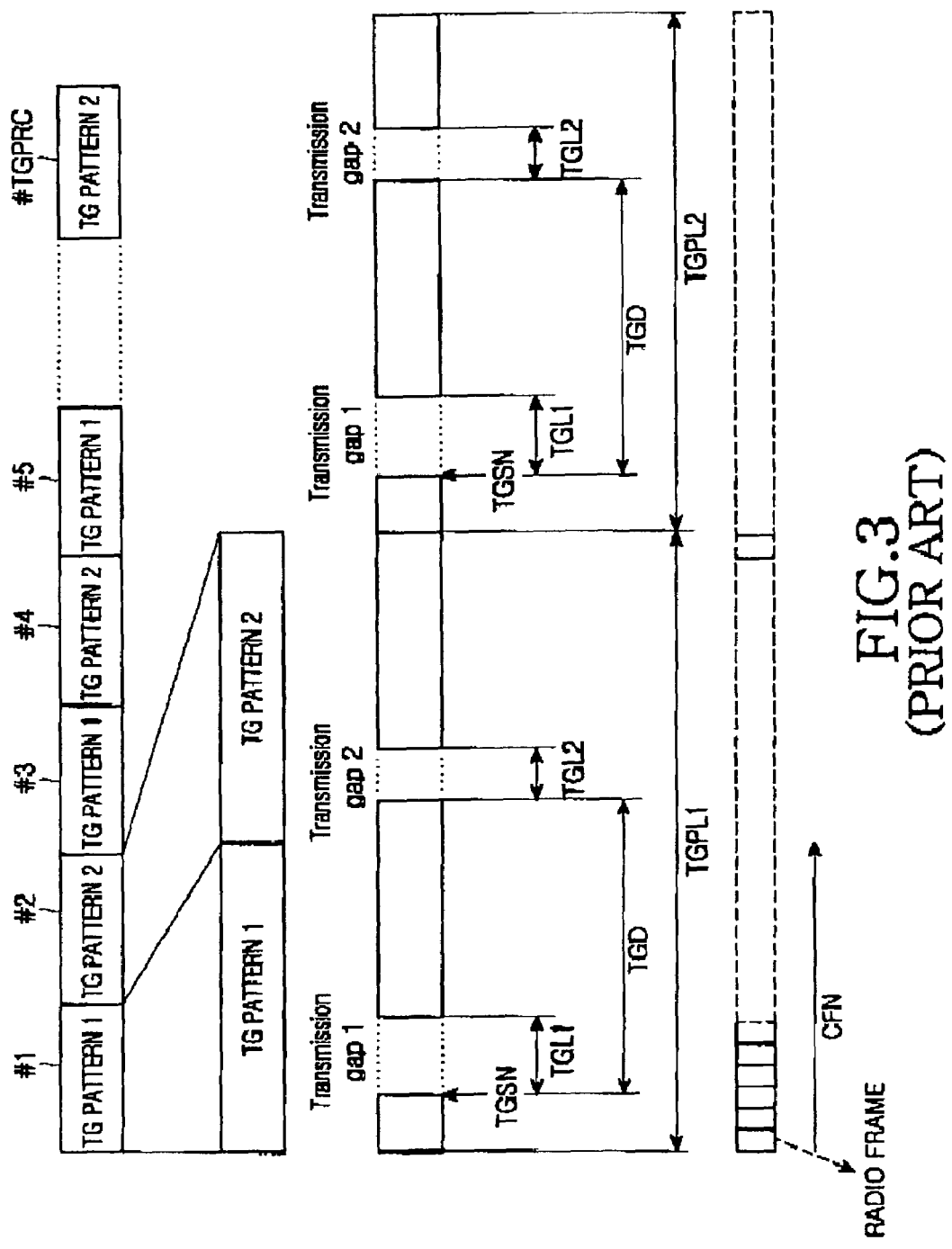
FIG. 3 schematically illustrates a conventional transmission format for the compressed mode.
Figure 4:
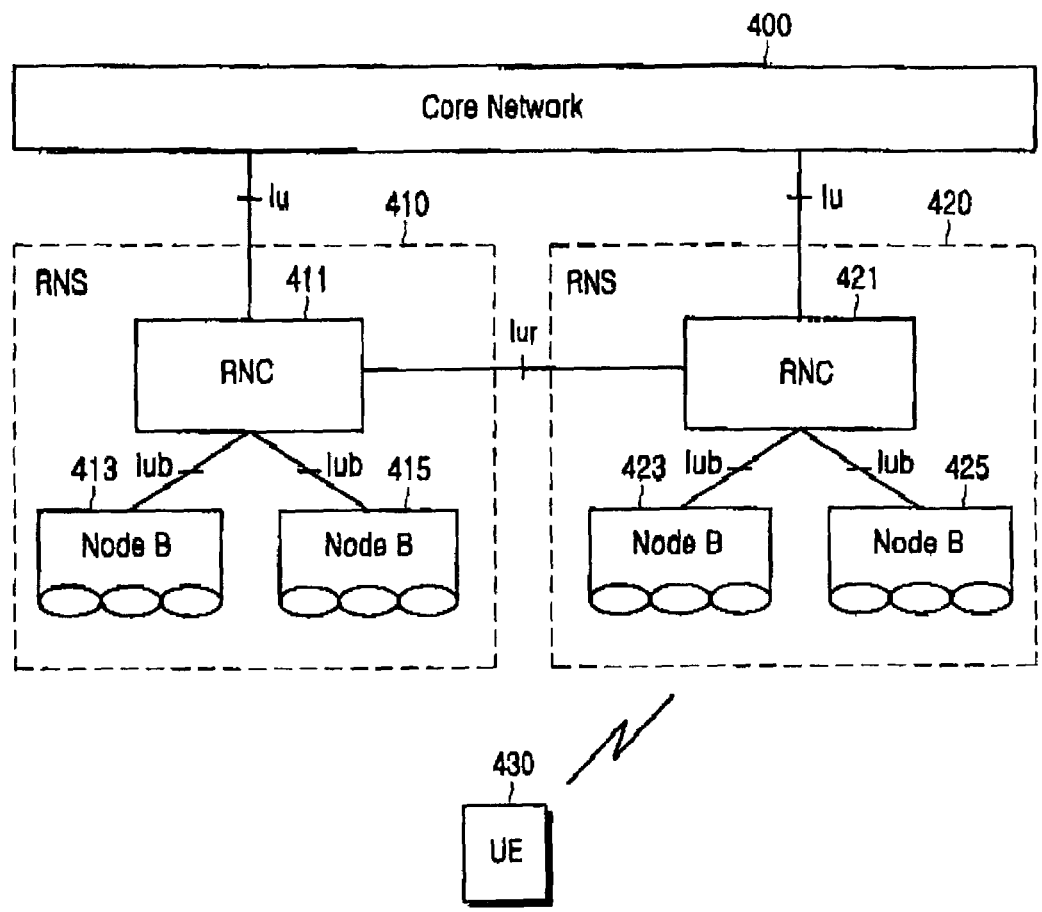
FIG. 4 schematically illustrates a structure of a conventional CDMA communication system.
Figure 5:
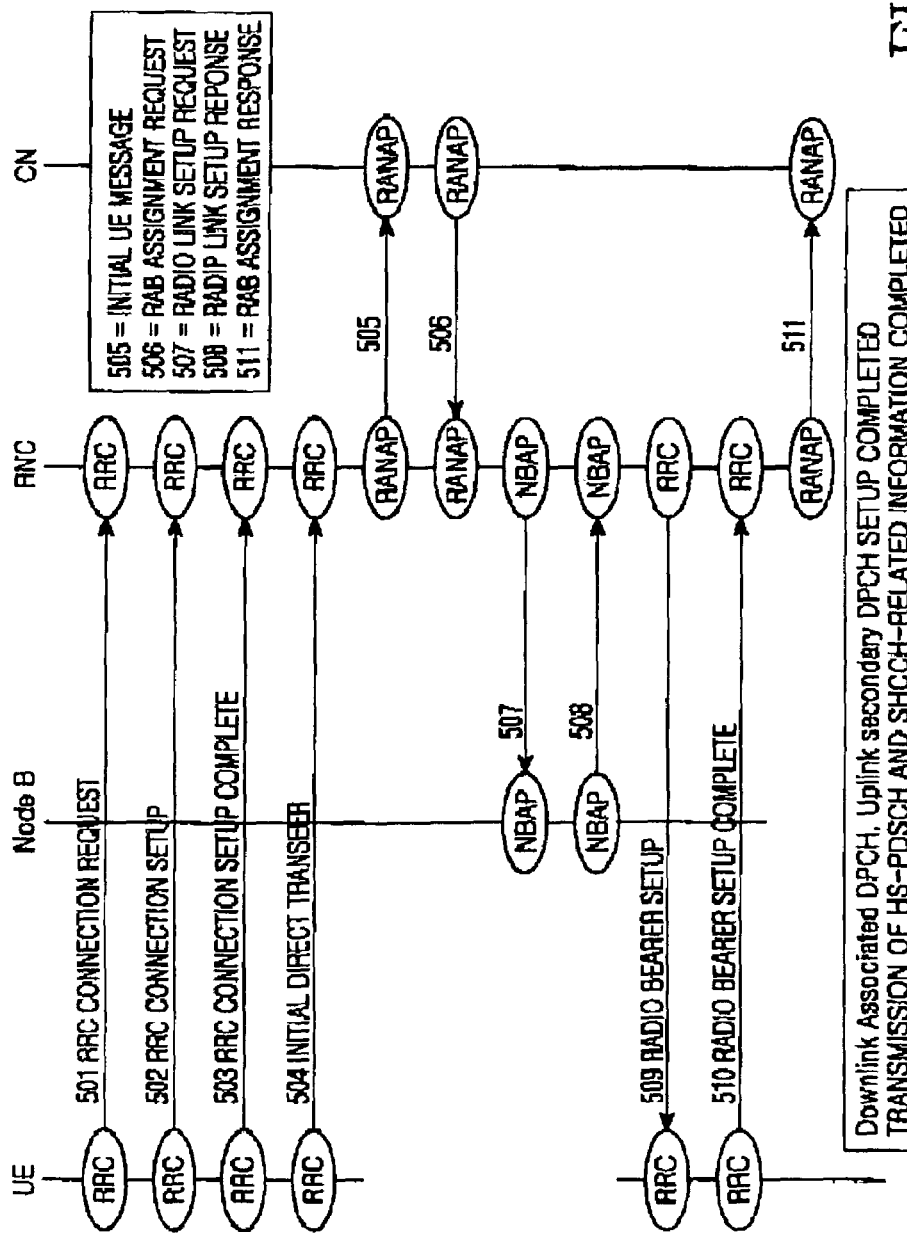
FIG. 5 is a flow diagram illustrating a process of setting up an HSDPA call in a conventional HSDPA communication system.

As described in conjunction with FIG. 3, since the compressed mode includes one TGPS, the TGPS is comprised of TGPRC TGPs, and the TPG is comprised of 2 transmission gaps. There are a total of 2*TGPRC transmission gaps for a particular UE. Herein, for the convenience of explanation, 2*TGPRC is substituted for a constant x indicating the sum of the transmission gaps. As a result, for a particular UE, there are x transmission gaps from a transmission gap #1 to a transmission gap #x. If a starting point of an $n^{th}$ transmission gap (or a transmission gap #n) is defined as TG_S(n), starting points of the transmission gaps are calculated as follows.

$$TG\_S(1) = TGSN$$

$$TG\_S(2) = TGSN + TGD$$

$$TG\_S(3) = TGPL1*15 + TGSN$$

$$TG\_S(4) = TGPL1*15 + TGSN + TGD$$

$$TG\_S(5) = (TGPL1 + TGPL2)*15 + TGSN$$

$$TG\_S(6) = (TGPL1 + TGPL2)*15 + TGSN + TGD$$

$$TG\_S(7) = (TGPL1 + TGPL2 + TGPL1)*15 + TGSN$$

$$TG\_S(8) = (TGPL1 + TGPL2 + TGPL1)*15 + TGSN + TGD$$

The calculated starting points of the transmission gaps show a regularity of Equation (1).

$$TG\_S(n) = n\ SHR\ 4*(TGPL1+TGPL2)*15+TGSN,\text{ for } n\bmod 4 = 1$$

$$TG\_S(n) = n\ SHR\ 4*(TGPL1+TGPL2)*15+TGSN+TGD,\text{ for } n\bmod 4 = 2$$

$$TG\_S(n) = n\ SHR\ 4*(2*TGPL1+TGPL2)*15+TGSN,\text{ for } n\bmod 4 = 3$$

$$TG\_S(n) = n\ SHR\ 4*(2*TGPL1+TGPL2)*15+TGSN+TGD,\text{ for } n\bmod 4 = 0 \qquad \text{Equation (1)}$$

In Equation (1), "a SHR n" represents a share (or quotient) obtained by dividing "a" by "n."

If a size of the $n^{th}$ transmission gap TG(n) is defined as TG_N(n), the sizes of the transmission gaps are calculated as follows.

$$TG\_N(n)=TGL1, \text{ for } n \bmod 2=1$$

$$TG\_N(n)=TGL2, \text{ for } n \bmod 2=0$$

Therefore, a starting point TG_NT_S(n) of an HSDPA non-transmittable period for the $n^{th}$ transmission gap is calculated by $$TG\_NT\_S(n)=TG\_S(n)-DL \text{ cycle size} \qquad \text{Equation (2)}$$

In Equation (2), "DL cycle size" represents a size of DL cycle expressed in terms of a time slot.

Further, a starting point TG_DA_S(n) of a delayed ACK transmission period is calculated by $$TG\_DA\_S(n)=TG\_S(n)-HSDPA \text{ cycle}$$

After the starting point and size of the non-transmittable periods of the transmission gaps, and the starting point of the delayed ACK transmission period for the UE with the compressed mode activated are calculated in the above manner, the non-transmittable period calculator 1108 operates as follows.

The non-transmittable period calculator 1108 increases a TS (Time Slot) counter TS_C by 1 every TS, beginning at 0, at a time point going a scheduling delay (SD) ahead of the TGCFN. Further, the non-transmittable period calculator 1108 provides an identifier of the corresponding UE and a TG_N(n) value to the scheduler 1104, each time the TS_C becomes equal to [TG_DA_S(n)–SD]. The scheduler 1104 then increases TS_C for the corresponding UE by 1 every TS beginning at 1, based on the UE identifier and TG_N(n) value provided from the non-transmittable period calculator 1108. Here, if 1+SD≦TS_C≦UL cycle+SD, then the corresponding UE exists in the delayed ACK transmission period, and if UL cycle+1+SD≦TS_C≦HSDPA cycle+TG_N(n)+SD, then the corresponding UE exists in the non-transmittable period, and resets the TS_C at the instant where TS_C>HSDPA cycle+TG_N(n)+SD.

Figure 6:
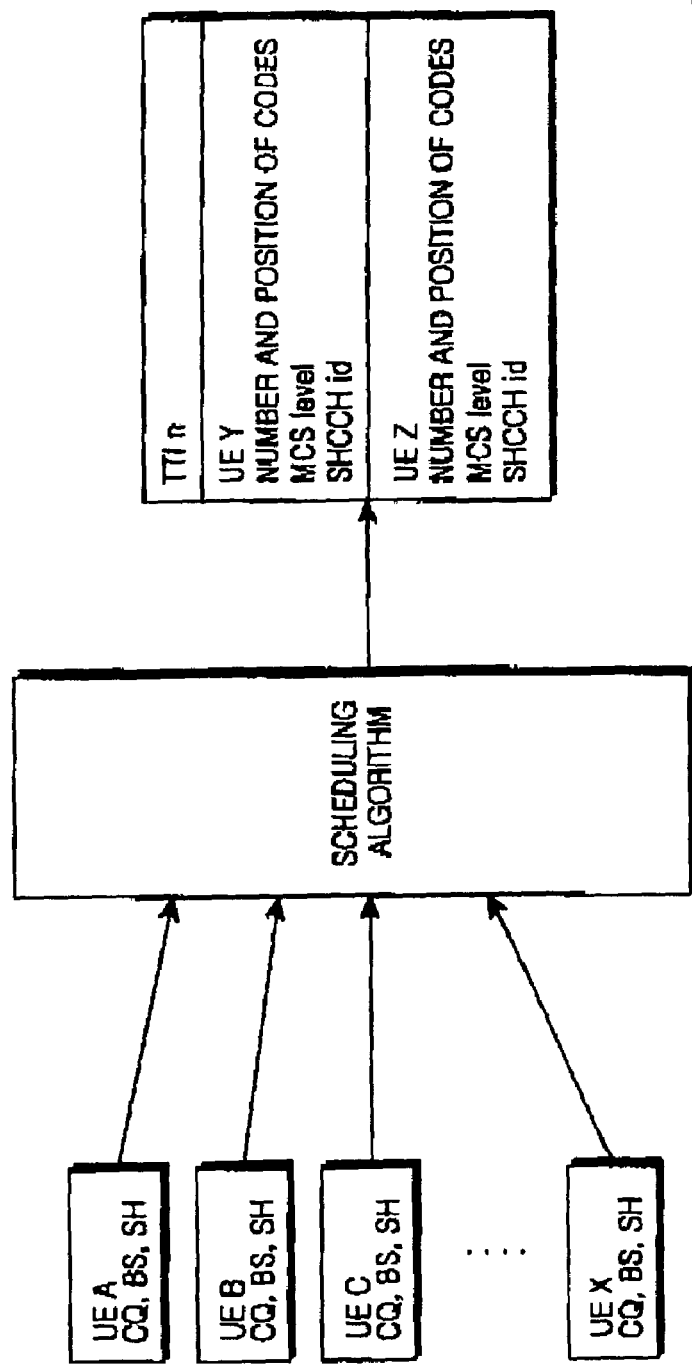
FIG. 6 schematically illustrates a scheduling algorithm for a Node B in a conventional HSDPA communication system.
Figure 7:
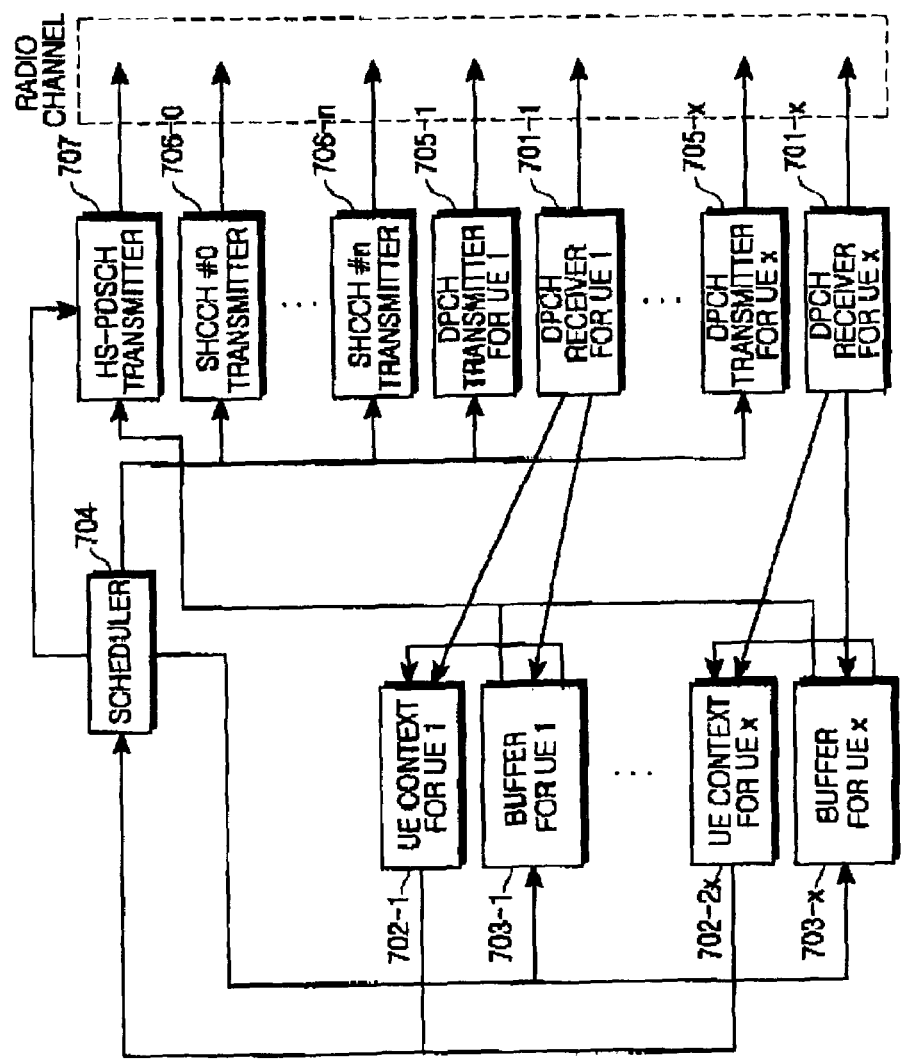
FIG. 7 illustrates a structure of a Node B transceiver in a conventional HSDPA communication system.

The scheduler 1104 performs the scheduling algorithm described in conjunction with FIG. 6 at periods of 3 TSs. If the scheduler 1104 selects the UE existing in the delayed ACK transmission period, then the scheduler 1104 provides ACK delay time to the corresponding UE. Here, the ACK delay time TG_N(n)+UL cycle–TS_C+SD. In addition, the TS_C represents a value of TS_C at corresponding time. The time point where the scheduler 1104 provides the ACK delay time is equal to a corresponding transmission point of the HS-PDSCH. The corresponding HS-PDSCH transmission point means TTI where HS-PDSCH transmission resources are assigned by the scheduling algorithm. For example, in the channel structure illustrated in FIG. 8, transmission of HS-PDSCH is determined by a scheduling algorithm operation, a scheduling delay before the HI is transmitted.

Further, if the buffer of the corresponding UE is provided with the ACK delay time, then the buffer converts an expected ACK arrival time (EAA) of a coded block transmitted at the corresponding time in accordance with Equation (3).

$$EAA(DA\_STATUS)=EAA(\text{Normal}\_STATUS)+ACK \text{ delay time} \qquad \text{Equation (3)}$$

In Equation (3), EAA(Normal_STATUS) represents a transmission starting point of a particular coded block and a reception ending point of an ACK/NACK signal for the coded block. An ACK signal, if it is not delayed as described in the present invention, has a predetermined value, which is previously agreed between Node B and UE. Commonly, the Node B performs a necessary operation such as retransmission on the coded block for which no ACK/NACK signal arrives until the EAA(Normal_STATUS) expires. However, the present invention, if the ACK signal is delayed, informs a retransmission block (or a buffer of the corresponding UE) of the fact through the above process, thereby delaying the necessary operation until the EAA(DA_STATUS) expires.

The scheduler 104 manages a list of UEs located in the non-transmittable period in a non-transmittable list. The "non-transmittable list" is a list of UEs satisfying [UL cycle+1+SD≦TS_C≦HSDPA cycle+TG_N(n)+SD]. If TS_C of a particular UE is reset, the corresponding UE is excluded from the non-transmittable list. The scheduler 1104 excludes an input value of the UEs included in the non-transmittable list, when applying input values to the scheduling algorithm illustrated in FIG. 6.

Next, an operation of UE will be described. If a compressed mode is performed through a Measurement Control message, the UE calculates TG_S(n) and TG_N(n) in the same way as an operation method of the non-transmittable period calculator 1108, and calculates TG_DA_S(n), TG_NT_S(n), and TG_NT_N(n) based on the calculated TG_S(n) and TG_N(n). The non-transmittable period calculator 1108 and the UE perform the process of calculating the TG_S(n), TG_N(n), TG_DA_S(n), TG_NT_S(n), and TG_NT_N(n), in the same manner. This is possible because the UE and the non-transmittable period calculator 1108 maintain the same CFN. That is, the UE maintains TS_C where a first TS of TGCFN is defined as 0. The TS_C is increased by 1 every TS. A value of the TS_C and a state of the UE are defined as follows.

If TG_DA_S(n)≦TS_C<TG_NT_S(n), then the UE is in a delayed ACK transmission state.

If TG_NT_S(n)≦TS_C<TG_NT_S(n)+TG_N(n), then the UE is in a non-receptible state.

If the TS_C does not correspond to either case, the UE is in a normal state, and the TS_C is reset if the compressed mode is ended.

Further, in the delayed ACK transmission state, the UE modifies ACK transmission time (ATT) as shown in Equation (4).

$$ATT(DA\_STATUS)=ATT(\text{Normal}\_STATUS)+TG\_N(n)+UL \text{ cycle}-TS\_C \qquad \text{Equation (4)}$$

In Equation (4), TS_C is a TS_C value at the corresponding time, and ATT(Normal_STATUS) is a time difference between a reception ending point of a particular coded block and a transmission starting point of an ACK/NACK signal for the coded block, and is calculated from the EAA, as follows.

$$ATT(\text{Normal}\_STATUS)=EAA(\text{Normal}\_STATUS)-TTI=EAA(\text{Normal}\_STATUS)-3TS[\text{timeslot}]$$

Figure 12:
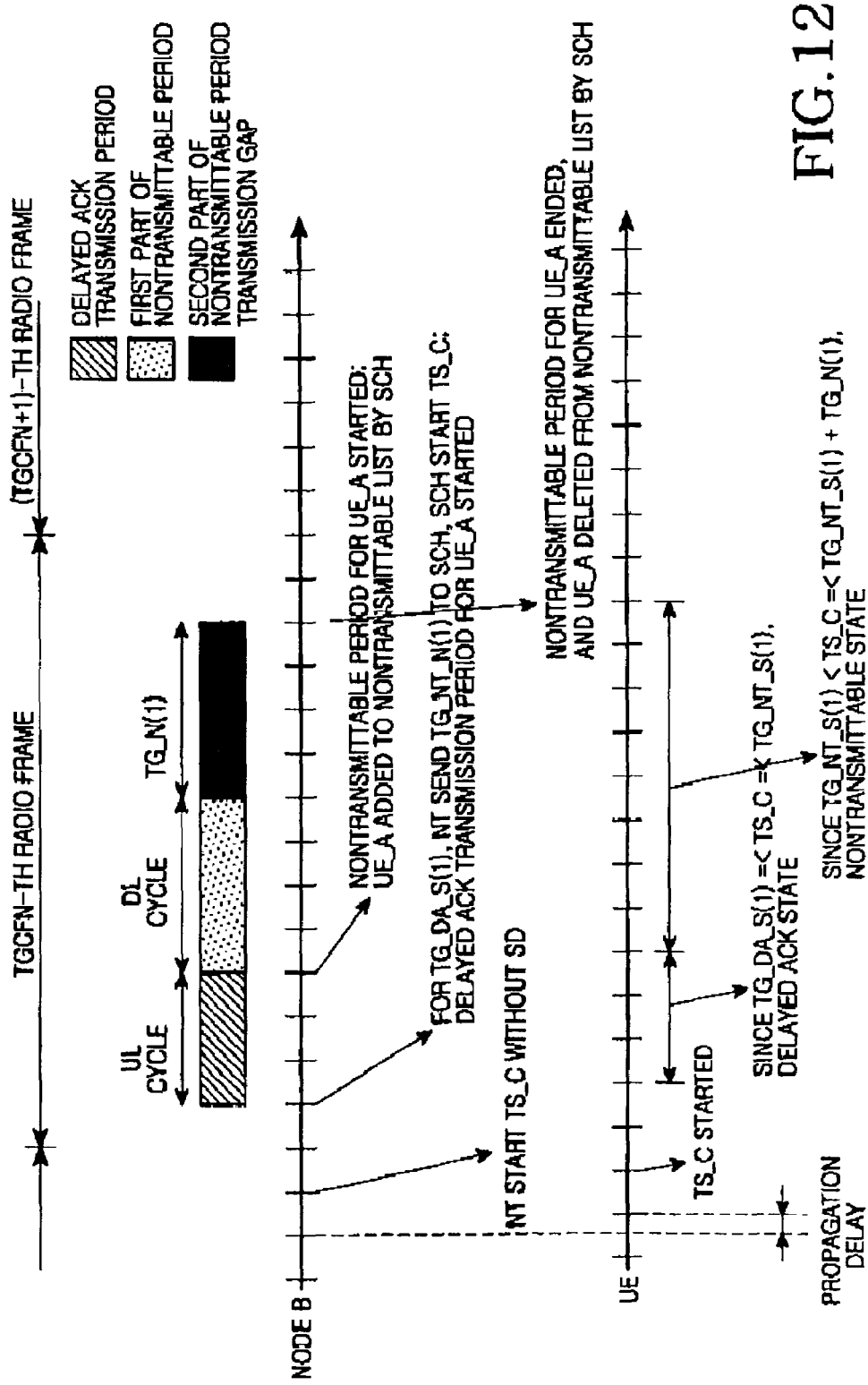
FIG. 12 is a timing diagram for minimizing the HSDPA non-transmittable period due to execution of the compressed mode is illustrated in FIG. 12.

In the non-receptible state, the UE can suspend reception and despreading of the SHCCH and HS-PDSCH. As the above statement, just a timing diagram for the processes of minimizing the HSDPA non-transmittable period due to execution of the compressed mode is illustrated in FIG. 12.

Figure 13:
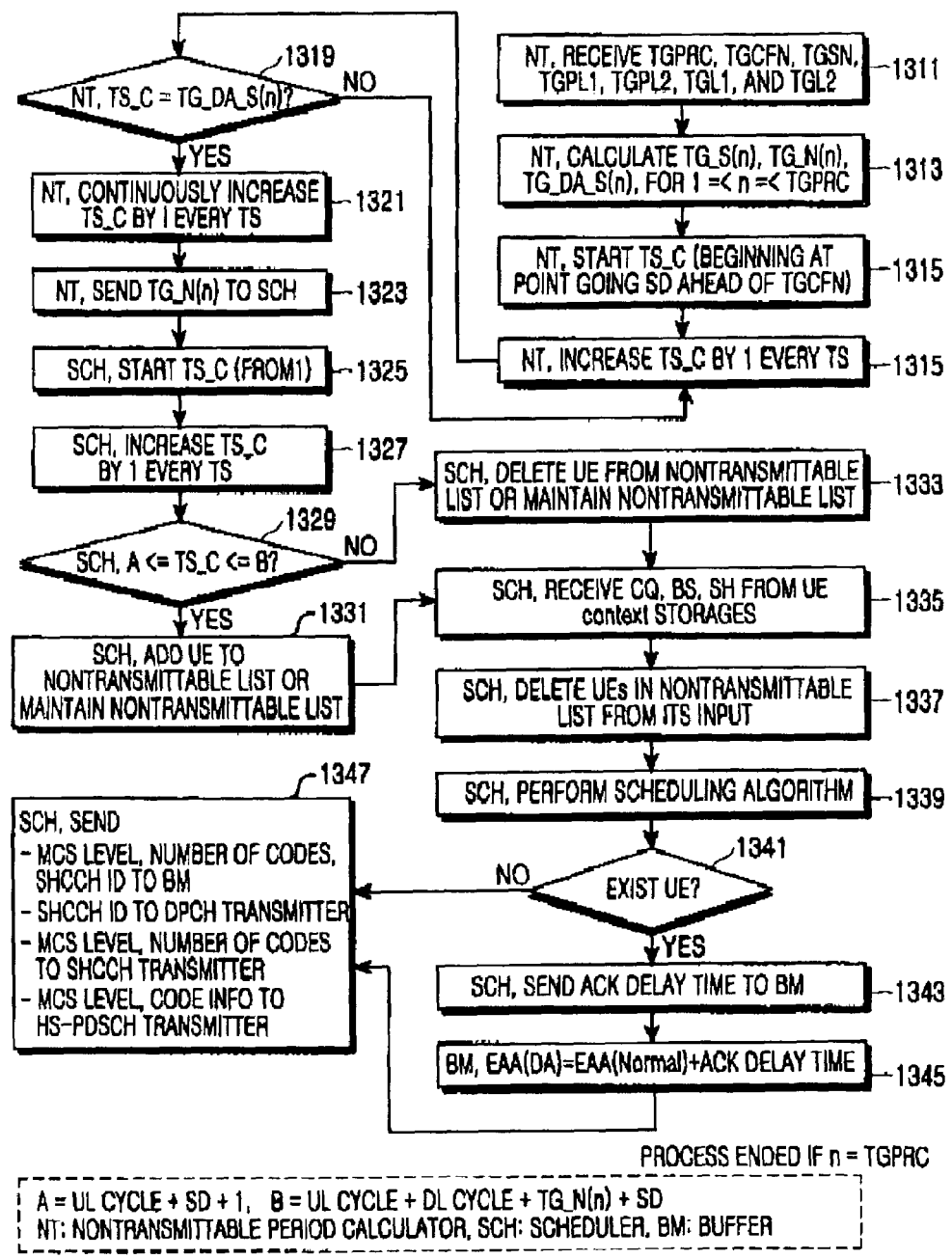
FIG. 13 is a flowchart illustrating a process of minimizing an HSDPA non-transmittable period due to a compressed mode by a Node B according to an embodiment of the present invention.

FIG. 13 is a flowchart illustrating a process of minimizing an HSDPA non-transmittable period due to a compressed mode by a Node B according to an embodiment of the present invention. Referring to FIG. 13, as a particular UE starts performing a compressed mode, the non-transmittable period calculator (NT) 1108 receives in step 1311 compressed mode information of TGPRC, TGCFN, TGSN, TGPL1, TGPL2, TGL1, and TGL2 from an upper layer, and then proceeds to step 1313. In step 1313, the non-transmittable period calculator 1108 calculates TG_S(n), TG_N(n), TG_DA_S(n) based on the received information of TGPRC, TGCFN, TGSN, TGPL1, TGPL2, TGL1, and TGL2, and then proceeds to step 1315. In step 1315, the non-transmittable period calculator 1108 starts counting TS_C at a time point going a scheduling delay ahead of the TGCFN. In step 1317, the non-transmittable period calculator 1108 increases a count value of the TS_C by 1 each time 1 TS expires, and then proceeds to step 1319.

In step 1319, the non-transmittable period calculator 1108 determines whether the count value of TS_C is identical to the TG_DA_S(n) value. If the count value of TS_C is not identical to the TG_DA_S(n) value, the non-transmittable period calculator 1108 returns to step 1317. However, if the count value of TS_C is identical to the TG_DA_S(n) value, the non-transmittable period calculator 1108 proceeds to step 1321. In step 1321, the non-transmittable period calculator 1108 continuously increases the count value of TS_C. In step 1323, if the count value of TS_C becomes equal to the TG_DA_S(n) value, the non-transmittable period calculator 1108 provides the TG_N(n) to the scheduler 1104, and then proceeds to step 1325.

In step 1325, the scheduler (SCH) 1104 starts counting the TS_C. In step 1327, the scheduler 1104 increases the TS_C count value by 1 each time 1 TS expires, and then proceeds to step 1329. In step 1329, the scheduler 1104 determines whether the TS_C count value is larger than or equal to UL cycle+SD+1, and lower than or equal to UL cycle+DL cycle+TG_N(n)+SD [UL cycle+SD+1≦TS_C≦UL cycle+DL cycle+TG_N(n)+SD]. If the TS_C count value satisfies the condition, the scheduler 1104 proceeds to step 1331. In step 1331, the scheduler 1104 adds the corresponding UE to a non-transmittable list or maintains the non-transmittable list, and then proceeds to step 1335. However, if the TS_C count value does not satisfies the condition of [UL cycle+SD+1≦TS_C≦UL cycle+DL cycle+TG_N(n)+SD], the scheduler 1104 proceeds to step 1333. In step 1333, the scheduler 1104 deletes the corresponding UE from the non-transmittable list or maintains the non-transmittable list, and then proceeds to step 1335.

In step 1335, the scheduler 1104 receives CQ, BS and SH from the UE context storages 1102-1 to 1102-x, and then proceeds to step 1337. In step 1337, the scheduler 1104 deletes UEs in the non-transmittable list from its scheduling input. In step 1339, the scheduler 1104 performs a predetermined scheduling algorithm on the corresponding UEs. In step 1341, the scheduler 1104 determines whether the UEs scheduled to service HSDPA data include UE existing in a delay ACK (DA) period. If there exists UE existing in the DA period, the scheduler 1104 proceeds to step 1343. In step 1343, the scheduler 1104 provides the buffers 1103-1 to 1103-x with ACK delay time information indicating that transmission of the ACK signal must be delayed, and then proceeds to step 1345. In step 1345, the buffers (BM) 1103-1 to 1103-x calculate EAA(DA) based on the ACK delay time and EAA(Normal), and then proceeds to step 1347. In step 1347, the scheduler 1104 provides information on MCS level, the number of codes and SHCCH identifier to the buffers 1103-a to 1103-x, provides information on HSCCH identifier to the DPCH transmitters 1105-1 to 1105-x, provides information on MCS level and the number of codes to the SHCCH transmitters 1106 to 1106-x, and provides MCS level and code information to the HS-PDSCH transmitter 1107, and then proceeds to step 1327. The process described above is repeated until n=TGPRC.

Figure 14:
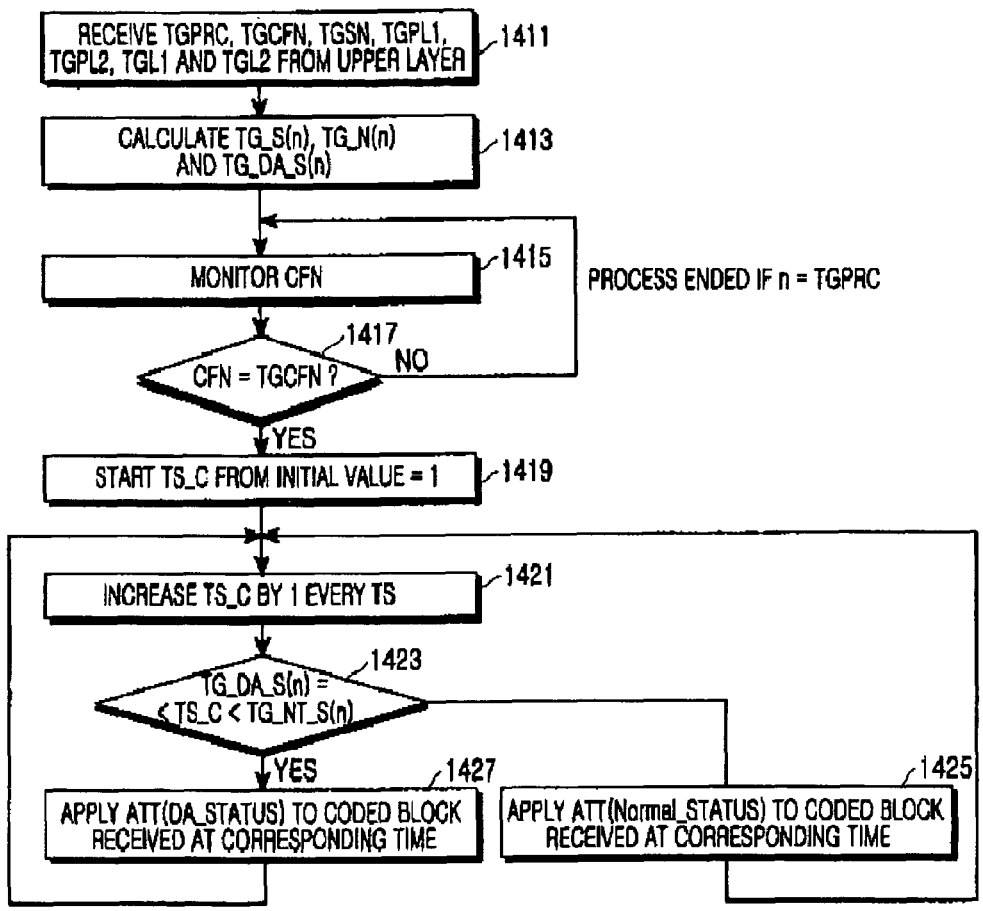
FIG. 14 is a flowchart illustrating a process of minimizing an HSDPA non-transmittable period due to execution of a compressed mode by UE according to an embodiment of the present invention.

FIG. 14 is a flowchart illustrating a process of minimizing an HSDPA non-transmittable period due to execution of a compressed mode by UE according to an embodiment of the present invention. Referring to FIG. 14, in step 1411, the UE, as it starts performing a compressed mode, receives compressed mode information of TGPRC, TGCFN, TGSN, TGPL1, TGPL2, TGL1 and TGL2 from an upper layer. In step 1413, the UE calculates TG_S(n), TG_N(n) and TG_DA_S(n) based on the received information of TGPRC, TGCFN, TGSN, TGPL1, TGPL2, TGL1, and TGL2. In step 1415, the UE monitors CFN of a currently received frame. In step 1417, the UE determines whether the monitored CFN is identical to TGCFN. If the CFN is not identical to TGCFN, the UE returns to step 1415 and continuously maintains CFN of the received frame. However, if the CFN is identical to TGCFN, the UE proceeds to step 1419. In step 1419, the UE starts counting TS_C. In step 1421, the UE increases the TS_C count value by 1 each time TS expires. In step 1423, the UE determines whether the TS_C count value is larger than or equal to TG_DA_S(n) and lower than or equal to TG_NT_S(n) [TG_DA_S(n)≦TS_C≦TG_NT_S(n)]. If the TS_C count value does not satisfy the condition of [TG_DA_S(n)≦TS_C≦TG_NT_S(n)], the UE proceeds to step 1425. In step 1425, the UE applies ATT(Normal_STATUS) to a coded block received at the corresponding time, and then returns to step 1421. Otherwise, if the TS_C count value satisfies the condition of [TG_DA_S(n)≦TS_C≦TG_NT_S(n)], the UE proceeds to step 1427. In step 1427, the UE applies ATT(DA_STATUS) to a coded block received at the corresponding time, and then returns to step 1421.

Summarizing, in the HSDPA communication system, if a compressed mode is performed while an HSDPA call is maintained, the present invention minimizes an HSDPA non-transmittable period where HSDPA service data for the HSDPA call cannot be transmitted, contributing to maximization in efficiency of HS-PDSCH transmission resources. That is, the present invention minimizes the HSDPA non-transmittable period caused by execution of the compressed mode, thereby maximizing efficiency of dedicated channel resources for maintaining the HSDPA call. Therefore, communication efficiency of the HSDPA call is raised. In addition, when UE perceives that Node B will transmit no HSDPA data to the UE for a particular time period, the UE may turn off its HS-PDSCH receiver and SHCCH receiver for the corresponding time period, thereby preventing unnecessary power consumption by the receivers.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a high-speed packet data in a mobile communication system including a first Node B, a UE (User Equipment) located in a cell occupied by the first Node B, and a second Node B neighboring to the first Node B, wherein the mobile communication system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap required by the UE to acquire second Node B information necessary for a handover to the second Node B when the UE enters a handover region between the first Node B and the second Node B, wherein a HSDPA cycle including the downlink transmission period and uplink transmission period is a minimum period required for transmitting data, the method comprising the steps of:

transmitting, by the first Node B, the high-speed packet data to the UE from the first Node B if a period from a start point of the HSDPA cycle to a start point of the transmission gap is greater than or equal to the downlink transmission period and is less than the size of the HSDPA cycle; and receiving, by the UE, the high-speed packet data and transmitting, by the UE, the acknowledgement signal to the Node B after transmission gap.

2. The method of claim 1, wherein the UE acquires the second Node B information by receiving a common pilot channel signal from the second Node B.

3. The method of claim 1, wherein the transmission gap is calculated using transmission gap pattern-related information, a transmission gap connection frame number (TGCFN), a transmission gap pattern repetition counter (TGPRC), and a transmission gap starting slot number (TGSN).

4. An apparatus for transmitting a high-speed packet data in a mobile communication system including a first Node B, a UE (User Equipment) located in a cell occupied by the first Node B, and a second Node B neighboring to the first Node B, wherein the mobile communication system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap required by the UE to acquire second Node B information necessary for a handover to the second Node B when the UE enters a handover region between the first Node B and the second Node B, wherein a HSDPA cycle including the downlink transmission period and uplink transmission period is a minimum period required for transmitting data, the apparatus comprising:

a first Node B for transmitting the high-speed packet data to the UE from the first Node B if a period from a start point of the HSDPA cycle to a start point of the transmission gap is greater than or equal to the downlink transmission period and is less than the size of the HSDPA cycle; and a UE for receiving the high-speed packet data and transmitting the acknowledgement signal to the Node B after transmission gap.

5. The apparatus of claim 4, wherein the UE acquires the second Node B information by receiving a common pilot channel signal from the second Node B.

6. The apparatus of claim 4, wherein the transmission gap is calculated using transmission gap pattern-related information, a transmission gap connection frame number (TGCFN), a transmission gap pattern repetition counter (TGPRC), and a transmission gap starting slot number (TGSN).

7. A method for minimizing a non-transmittable period in which high-speed packet data transmission by a first Node B is impossible, in a mobile communication system including a first Node B, a UE (User Equipment) located in a cell occupied by the first Node B, and a second Node B neighboring to the first Node B, wherein the mobile communication system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap required by the UE to acquire second Node B information necessary for a handover to the second Node B when the UE enters a handover region between the first Node B and the second Node B, the method comprising the steps of:

recognizing, by the first Node B, the transmission gap when the downlink transmission period is ended; and recognizing, by the first Node B, the uplink transmission period after the transmission gap is ended.

8. The method of claim 7, wherein the UE acquires the second Node B information by receiving a common pilot channel signal from the second Node B.

9. A method for minimizing a non-transmittable period in which high-speed packet data transmission by a first Node B is impossible, in a mobile communication system including a first Node B, a UE (User Equipment) located in a cell occupied by the first Node B, and a second Node B neighboring to the first Node B, wherein the mobile communication system transmits a control signal over a shared control channel in order to transmit the high-speed packet data from the first Node B to the UE, and has a downlink transmission period for transmitting the high-speed packet data over a data channel, an uplink transmission period for transmitting from the LIE to the first Node B an acknowledgement signal indicating whether the UE has received the high-speed packet data from the first Node B, and a transmission gap required by the UE to acquire second Node B information necessary for a handover to the second Node B when the UE enters a handover region between the first Node B and the second Node B, the method comprising the steps of:

receiving transmission gap-related information for the UE from a radio network controller, and calculating a transmission gap starting point based on the transmission gap-related information; and defining a period determined by excluding the downlink transmission period from a transmission gap with the transmission gap starting point as the non-transmittable period, and suspending transmission of the high-speed packet data to the UE for the non-transmittable period.

10. The method of claim 9, wherein the transmission gap-related information comprises transmission gap pattern-related information, a transmission gap connection frame number (TGCFN), a transmission gap pattern repetition counter (TGPRC), and a transmission gap starting slot number (TGSN).

11. An apparatus for minimizing a non-transmittable period in which high-speed packet data transmission by a first Node B is impossible, in a mobile communication system including a first Node B, a UE (User Equipment) located in a cell occupied by the first Node B, and a second Node B neighboring to the first Node B, wherein the mobile communication system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap required by the UE to acquire second Node B information necessary for a handover to the second Node B when the UE enters a handover region between the first Node B and the second Node B, the apparatus comprising:

a non-transmittable period calculator for recognizing the transmission gap when the downlink transmission period is ended, and recognizing the uplink transmission period after the transmission gap is ended; and a scheduler for performing scheduling on the high-speed packet data under control of the non-transmittable period calculator so that the high-speed packet data is transmitted during the downlink transmission period.

12. The apparatus of claim 11, wherein the scheduler performs scheduling on an acknowledgement signal for the high-speed packet data transmitted during the downlink transmission period so that the acknowledgement signal is received after the non-transmittable period.

13. The apparatus of claim 11, wherein the non-transmittable period calculator receives transmission gap-related information for the UE from a radio network controller, calculates a transmission gap starting point based on the transmission gap-related information, defines a period determined by excluding the downlink transmission period from a transmission gap with the transmission gap starting point as the non-transmittable period, and suspends transmission of the high-speed packet data to the UE for the non-transmittable period.

14. The apparatus of claim 13, wherein the transmission gap-related information comprises transmission gap pattern-related information, a transmission gap connection frame number (TGCFN), a transmission gap pattern repetition counter (TGPRC), and a transmission gap starting slot number (TGSN).

15. An apparatus for minimizing a non-transmittable period in which high-speed packet data transmission by a first Node B is impossible, in a mobile communication system including a first Node B, a UE (User Equipment) located in a cell occupied by the first Node B, and a second Node B neighboring to the first Node B, wherein the mobile communication system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap required by the UE to acquire second Node B information necessary for a handover to the second Node B when the UE enters a handover region between the first Node B and the second Node B, the apparatus comprising:

a non-transmittable period calculator for receiving transmission gap-related information for the UE from a radio network controller, calculating a transmission gap starting point based on the transmission gap-related information, defining a period determined by excluding the downlink transmission period from a transmission gap with the transmission gap starting point as the non-transmittable period, and suspending transmission of the high-speed packet data to the UE for the non-transmittable period; and a scheduler for performing scheduling on the high-speed packet data under the control of the non-transmittable period calculator so that transmission of the high-speed packet data to the UE is suspended for the downlink transmission period.

16. The apparatus of claim 15, wherein the transmission gap-related information comprises transmission gap pattern-related information, a transmission gap connection frame number (TGCFN), a transmission gap pattern repetition counter (TGPRC), and a transmission gap starting slot number (TGSN).

17. A method for minimizing a non-receptible period in which high-speed packet data reception by a UE (User Equipment) is impossible, in a mobile communication system including a first Node B, the UE located in a cell occupied by the first Node B, and a second Node B neighboring to the first Node B, wherein the mobile communication system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap required by the UE to acquire second Node B information necessary for a handover to the second Node B when the UE enters a handover region between the first Node B and the second Node B, the method comprises the steps of:

receiving transmission gap-related information for the UE from a radio network controller, and calculating a transmission gap starting point and a non-receptible period corresponding to the transmission gap based on the transmission gap-related information;

calculating a delayed acknowledgement signal transmission period by excluding the downlink transmission period and the uplink transmission period from the transmission gap starting point; and upon receiving the high-speed packet data from the first Node B, transmitting an acknowledgement signal for the high-speed packet data for a period between a starting point of the delayed acknowledgement signal transmission period and a starting point of the non-receptible period.

18. The method of claim 17, wherein the transmission gap-related information comprises transmission gap pattern-related information, a transmission gap connection frame number (TGCFN), a transmission gap pattern repetition counter (TGPRC), and a transmission gap starting slot number (TGSN).

19. The method of claim 17, wherein the non-receptible period is identical to a period determined by excluding the downlink transmission period from a transmission gap with the transmission gap starting point.

20. An apparatus for minimizing a non-receptible period in which high-speed packet data reception by a UE (User Equipment) is impossible, in a mobile communication system including a first Node B, the UE located in a cell occupied by the first Node B, and a second Node B neighboring to the first Node B, wherein the mobile communication system transmits a control signal over a shared control channel in order to transmit the high-speed packet data from the first Node B to the UE, and has a downlink transmission period for transmitting the high-speed packet data over a data channel, an uplink transmission period for transmitting from the UE to the first Node B an acknowledgement signal indicating whether the UE has received the high-speed packet data from the first Node B, and a transmission gap required by the UE to acquire second Node B information necessary for a handover to the second Node B when the UE enters a handover region between the first Node B and the second Node B, the apparatus comprising:

a scheduler for receiving transmission gap-related information for the UE from a radio network controller, and calculating a transmission gap starting point and a non-receptible period corresponding to the transmission gap based on the transmission gap-related information, and calculating a delayed acknowledgement signal transmission period by excluding the downlink transmission period and the uplink transmission period from a transmission gap with the transmission gap starting point; and a transmitter for transmitting an acknowledgement signal for the high-speed packet data received from the first Node B, for a period between a starting point of the delayed acknowledgement signal transmission period and a starting point of the non-receptible period.

21. The apparatus of claim 20, wherein the transmission gap-related information comprises transmission gap pattern-related information, a transmission gap connection frame number (TGCFN), a transmission gap pattern repetition counter (TGPRC), and a transmission gap starting slot number (TGSN).

22. The apparatus of claim 20, wherein the non-receptible period is identical to a period determined by excluding the downlink transmission period from a transmission gap with the transmission gap starting point.

* * * * *